(12) United States Patent
Szatmary et al.

(10) Patent No.: US 11,363,929 B2
(45) Date of Patent: Jun. 21, 2022

(54) APPARATUS AND METHODS FOR PROGRAMMING AND TRAINING OF ROBOTIC HOUSEHOLD APPLIANCES

(71) Applicant: Brain Corporation, San Diego, CA (US)

(72) Inventors: Botond Szatmary, San Diego, CA (US); Vadim Polonichko, San Diego, CA (US)

(73) Assignee: Brain Corporation, San Diego, CA (US)

( * ) Notice: Subject to any disclaimer, the term of this patent is extended or adjusted under 35 U.S.C. 154(b) by 293 days.

(21) Appl. No.: 16/454,199

(22) Filed: Jun. 27, 2019

(65) Prior Publication Data

US 2019/0380551 A1 Dec. 19, 2019

Related U.S. Application Data

(63) Continuation of application No. 15/665,146, filed on Jul. 31, 2017, now Pat. No. 10,376,117, which is a
(Continued)

(51) Int. Cl.
| | |
|---|---|
| *A47L 9/28* | (2006.01) |
| *A47L 9/00* | (2006.01) |
| *G05D 1/02* | (2020.01) |
| *G06N 3/00* | (2006.01) |
| *G06N 3/04* | (2006.01) |

(52) U.S. Cl.
CPC .......... *A47L 9/2847* (2013.01); *A47L 9/009* (2013.01); *A47L 9/2805* (2013.01); *A47L 9/2842* (2013.01); *A47L 9/2852* (2013.01); *G05D 1/0221* (2013.01); *G06N 3/008* (2013.01); *A47L 2201/04* (2013.01); *A47L 2201/06* (2013.01); *G05D 2201/0215* (2013.01); *G06N 3/049* (2013.01)

(58) Field of Classification Search
CPC .... A47L 9/2847; A47L 9/2805; A47L 9/2852; A47L 9/009; A47L 9/2842; A47L 2201/04; A47L 2201/06; G06N 3/008; G06N 3/049; G05D 1/0221; G05D 2201/0215
See application file for complete search history.

(56) References Cited

U.S. PATENT DOCUMENTS

| | | | |
|---|---|---|---|
| 2009/0194137 A1* | 8/2009 | Friedman | A47L 11/4061 134/18 |
| 2017/0168492 A1* | 6/2017 | Shitamoto | G05D 1/0274 |
| 2017/0168499 A1* | 6/2017 | Bjorn | G05D 1/0038 |

* cited by examiner

*Primary Examiner* — Rodney A Butler
(74) *Attorney, Agent, or Firm* — Reed Smith LLP; Sidharth Kapoor

(57) ABSTRACT

Apparatus and methods for training and operating of robotic appliances. Robotic appliance may be operable to clean user premises. The user may train the appliance to perform cleaning operations in constrained areas. The appliance may be configured to clean other area of the premises automatically. The appliance may perform premises exploration and/or determine map of the premises. The appliance may be provided priority information associated with areas of the premises. The appliance may perform cleaning operations in order of the priority. Robotic vacuum cleaner appliance may be configured for safe cable operation wherein the controller may determine one or more potential obstructions (e.g., a cable) along operating trajectory. Upon approaching the cable, the controller may temporarily disable brushing mechanism in order to prevent cable damage.

15 Claims, 13 Drawing Sheets

Related U.S. Application Data continuation of application No. 14/632,842, filed on Feb. 26, 2015, now Pat. No. 9,717,387.

140 = robot
142, 144, 146 = locations of robot 140
160 = table
162 = couch

300 = controller apparatus

402 = switching component
410 = pre-programmed predictor
412 = learning predictor 442 = switching component
450 = reflexive predictor
452 = learning predictor 472 = converter component
480 = unattended control process
482 = learning control process 510 = unattended control process
512 = learning control process 540 = pre-configured predictor component
542 = learning predictor component
550 = discrepancy component
552 = combiner component 704 = localized interface device
706 = cloud entity
710_1 = controller
710_2 = controller 1102 = object of interest

APPARATUS AND METHODS FOR PROGRAMMING AND TRAINING OF ROBOTIC HOUSEHOLD APPLIANCES

CROSS-REFERENCE TO RELATED APPLICATIONS

This application is a continuation of U.S. patent application Ser. No. 15/665,146 filed on Jul. 31, 2017, which is a continuation of U.S. patent application Ser. No. 14/632,842 filed on Feb. 26, 2015, now U.S. Pat. No. 9,717,387, all of which are incorporated herein by reference in their entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE DISCLOSURE

The present disclosure relates to, inter alia, computerized apparatus and methods for training of robotic devices to perform various tasks.

BACKGROUND

Robotic devices may be used in a variety of industries, such as manufacturing, medical, safety, military, exploration, and/or other industries. Robotic "autonomy", i.e., the degree of human control, may vary significantly according to application. Some existing robotic devices (e.g., manufacturing assembly and/or packaging) may be programmed in order to provide desired functionality without further supervision. Some robotic devices (e.g., surgical robots) may be controlled by humans.

Robotic devices may comprise hardware components that enable the robot to perform actions in one dimension (e.g., a single range of movement), two dimensions (e.g., a plane of movement), and/or three dimensions (e.g., a space of movement). Typically, movement may be characterized according to so-called "degrees of freedom". A degree of freedom may refer to an independent range of movement. Thus, a mechanism with a number of possible independent relative movements (N) may be said to have N degrees of freedom. Some robotic devices may operate with multiple degrees of freedom (e.g., a turret and/or a crane arm configured to rotate around vertical and/or horizontal axes). Other robotic devices may be configured to follow one or more trajectories characterized by one or more state parameters (e.g., position, velocity, acceleration, orientation, and/or other state parameters). It is further appreciated that some robotic devices may simultaneously control multiple actuators (in connection with degrees of freedom) resulting in very complex movements.

Users may utilize robots that provide functionality out of the box (e.g., pre-programmed). Some users may train a robot with supervised learning to perform a task (e.g., navigation, manipulation, and/or other tasks).

SUMMARY

One aspect of the disclosure relates to a robotic vacuum cleaning appliance apparatus. The apparatus may include a sensor component configured to provide information related to one or more objects within an environment of the apparatus. The apparatus may include a propulsion component configured to propel the apparatus along a trajectory within the environment. The apparatus may include a brushing component configured for contact with a surface of the environment. The apparatus may include an air pump component configured to provide an airflow via an intake disposed proximate the brushing component. The apparatus may include an enclosure configured to house the propulsion component, brushing component, and the airflow component. The apparatus may include a controller component in operable communication with the sensor component, the brushing component, and the air pump component. The controller component may be configured to: determine a presence of an obstruction on the surface along the trajectory; responsive to approaching the obstruction, deactivate a motion of the brushing component and proceed over the obstruction while maintaining the airflow via the intake; and responsive to proceeding over the obstruction, reactivate the brushing motion.

In some implementations, the motion of the brushing component may be controllable independent from the airflow. The airflow may be controllable independent from the motion of the brushing component.

In some implementations, the obstruction may comprises a cable. Deactivating the motion of the brushing component may reduce a probability of the apparatus damaging cable.

In some implementations, the surface may comprise a floor. The brushing component may be disposed on a bottom portion of the enclosure. The apparatus may include an adjustment component configured to adjust a clearance between the floor and the bottom portion of the enclosure. The clearance may be between a first clearance value and a second clearance value. The second clearance value may be greater than the first clearance value.

In some implementations, the airflow may be configured to remove debris from the floor. Maintaining the airflow via the intake may be configured to remove debris proximate to the cable.

In some implementations, the deactivation may be performed based on (1) a distance between the brushing component and the cable and (2) a speed of approach of the apparatus towards the cable.

Another aspect of the disclosure relates to a non-transitory machine-readable storage medium having instructions embodied thereon. The instructions may be executable by a processor to perform a method of operating a robotic appliance apparatus. The method may comprise: based on a first indication from a user, operating the robotic appliance apparatus in a premises exploration mode to produce a map characterizing an interior of a user premises; storing the map in memory; based on a second indication from the user, storing a plurality of waypoints, individual waypoints corresponding to waypoint coordinates on the map; navigating along a first trajectory comprising the plurality of waypoints, navigation along the first trajectory being characterized by a waypoint order; and navigating along a second trajectory, navigation along the second trajectory being characterized by coordinates distant from waypoint coordinates.

In some implementations, the first indication may be based on an explore premises command from the user. The premises exploration mode may be configured based on a random trajectory selection process.

In some implementations, the premises may include a room having a floor, a wall, and one or more objects disposed on the floor. The map may include information related to a position of individual ones of the one or more objects. The first trajectory may include a path proximate to at least one of the one or more objects and the wall. The second trajectory may include a path away from at least one of the one or more objects and the wall.

In some implementations, the path proximate to at least one of the one or more objects and the wall may be within a distance of less than one half of a dimension of the robotic appliance apparatus from a nearest one of the one or more objects or the wall.

In some implementations, the path away from at least one of the one or more objects and the wall may be at a range of no less than one half of a dimension of the robotic appliance apparatus from a nearest one of the one or more objects or the wall.

In some implementations, individual ones of the one or more objects may include one or more of a bicycle, a dining table, a chair, or a couch.

Yet another aspect of the disclosure relates to a method of operating a robotic vacuum cleaner in a household. The method may be performed by one or more processors executing instructions stored by a non-transitory machine-readable storage medium. The method may comprise: obtaining priority information, the priority information conveying a first priority associated with a first area of the household relative a second priority of a second area of the household; accessing a map of the household, the map conveying a position of one or more objects within the household; accessing first trajectory information, the first trajectory information being related to the first area of the household associated with the first priority; and performing a first cleaning operation of the first area based on the first priority being greater than the second priority, the first cleaning operation being characterized by a first trajectory configured to avoid at least one of the one or more objects, the first trajectory being based on the map.

In some implementations, the priority information may be provided to the robotic vacuum cleaner via a remote interface apparatus.

In some implementations, the remote interface apparatus may include a computing device having a touch screen user interface.

In some implementations, the remote interface apparatus may include a wireless remote control device having one or more buttons. Activation of one of the one or more buttons may communicate the first priority information.

In some implementations, the priority information may be obtained by the robotic vacuum cleaner based on an analysis of an output of a debris sensor.

In some implementations, the first priority may be obtained based on an occurrence of one or more prior training trials associated with at least the first area.

In some implementations, the method may comprise executing a premises exploration operation. The premises exploration operation may include: navigating an exploration trajectory; upon exploration of a sampling interval of a plurality of sampling intervals, determining a distance to a nearest obstacle and a location of the robotic vacuum cleaner; storing the location and the position; amending the map based on a plurality of locations and positions associated with individual ones of the plurality of sampling intervals; and storing the amended map in memory.

In some implementations, the exploration trajectory may be configured based on a random selection of direction of motion of the robotic vacuum cleaner.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

Figure 1A:
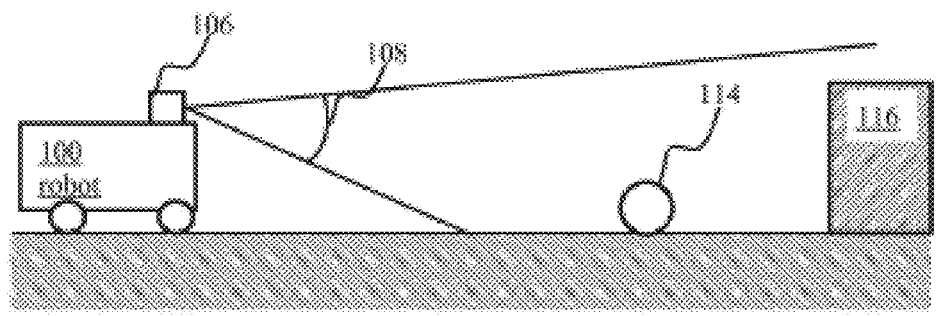
FIG. 1A is a graphical illustration depicting a robotic apparatus comprising an adaptive controller configured for autonomous navigation, in accordance with one or more implementations.

All Figures disclosed herein are © Copyright 2015 Brain Corporation. All rights reserved.

DETAILED DESCRIPTION

Implementations of the present disclosure will now be described in detail with reference to the drawings, which are provided as illustrative examples so as to enable those skilled in the art to practice the present technology. Notably, the figures and examples below are not meant to limit the scope of the present disclosure to a single implementation, but other implementations are possible by way of interchange of or combination with some or all of the described or illustrated elements. Wherever convenient, the same reference numbers will be used throughout the drawings to refer to same or like parts.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation may be combined with one or more features of any other implementation In the present disclosure, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" could be optical, wireless, infrared or another type of communication medium. The exact topology of the bus could be for example standard "bus", hierarchical bus, network-on-chip, address-event-representation (AER) connection, or other type of communication topology used for accessing, e.g., different memories in pulse-based system.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet or "phablet" computers, portable navigation aids, J2ME equipped devices, smart TVs, cellular telephones, smart phones, personal integrated communication or entertainment devices, or literally any other device capable of executing a set of instructions and processing an incoming data signal.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and other languages.

As used herein, the terms "connection", "link", "synaptic channel", "transmission channel", "delay line", are meant generally to denote a causal link between any two or more entities (whether physical or logical/virtual), which enables information exchange between the entities.

As used herein the term feature may refer to a representation of an object edge, determined by change in color, luminance, brightness, transparency, texture, and/or curvature. The object features may comprise, inter alia, individual edges, intersections of edges (such as corners), orifices, and/or curvature As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "processor", "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the term "network interface" refers to any signal, data, or software interface with a component, network or process including, without limitation, those of the FireWire (e.g., FW400, FW800, and/or other FireWire implementation), USB (e.g., USB2), Ethernet (e.g., 10/100, 10/100/1000 (Gigabit Ethernet), 10-Gig-E, and/or other technologies), MoCA, Coaxsys (e.g., TVnet™), radio frequency tuner (e.g., in-band or OOB, cable modem, and/or other technologies), Wi-Fi (802.11), WiMAX (802.16), PAN (e.g., 802.15), cellular (e.g., 3G, LTE/LTE-A/TD-LTE, GSM, and/or other cellular interface implementation) or IrDA families.

As used herein, the terms "pulse", "spike", "burst of spikes", and "pulse train" are meant generally to refer to, without limitation, any type of a pulsed signal, e.g., a rapid change in some characteristic of a signal, e.g., amplitude, intensity, phase or frequency, from a baseline value to a higher or lower value, followed by a rapid return to the baseline value and may refer to any of a single spike, a burst of spikes, an electronic pulse, a pulse in voltage, a pulse in electrical current, a software representation of a pulse and/or burst of pulses, a software message representing a discrete pulsed event, and any other pulse or pulse type associated with a discrete information transmission system or mechanism.

As used herein, the term "Wi-Fi" refers to, without limitation, any of the variants of IEEE-Std. 802.11 or related standards including 802.11 a/b/g/n/s/v and 802.11-2012.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, and/or other wireless interface implementation), FHSS, DSSS, GSM, PAN/802.15, WiMAX (802.16), 802.20, narrowband/FDMA, OFDM, PCS/DCS, LTE/LTE-A/TD-LTE, analog cellular, CDPD, RFID or NFC (e.g., EPC Global Gen. 2, ISO 14443, ISO 18000-3), satellite systems, millimeter wave or microwave systems, acoustic, and infrared (e.g., IrDA).

FIG. 1A depicts a mobile robotic apparatus 100 that may be configured with an adaptive controller in accordance with one or more implementations of e.g., the learning apparatuses illustrated in FIGS. 2-5, infra. The robotic apparatus 100 may comprise a sensor component 106. The sensor component 106 may be characterized by an aperture and/or field of view 108. Generally speaking, a field of view may be described as an extent of the observable world that may be captured by the sensor at a given moment. The sensor component 106 may provide information associated with objects within the field-of-view 108. In one or more implementations, such as object recognition, and/or obstacle avoidance, the output provided by the sensor component 106 may comprise a stream of pixel values associated with one or more digital images. In one or more implementations wherein the sensor 106 may comprise video, radar, sonography, x-ray, magnetic resonance imaging, and/or other types of sensors, the sensor output may be based on electromagnetic waves (e.g., visible light, infrared (IR), ultraviolet (UV), and/or other types of electromagnetic waves) entering an imaging sensor array. In some implementations, the imaging sensor array may comprise one or more of artificial retinal ganglion cells (RGCs), a charge coupled device (CCD), an active-pixel sensor (APS), and/or other sensors. The input signal may comprise a sequence of images and/or image frames. The sequence of images and/or image frame may be received from a CCD camera via a receiver apparatus and/or downloaded from a file. The image may comprise a two-dimensional matrix of red/green/blue (RGB) values. The values may be refreshed at a 25 Hz frame rate and/or other frame rate. In some implementations, the RGB image data may be augmented with range (e.g., visual scene depth) data to produce RGB-D frame. It will be appreciated by those skilled in the arts that the above image parameters are merely exemplary, and many other image representations (e.g., bitmap, CMYK, HSV, HSL, grayscale, and/or other representations) and/or frame rates may be utilized in various implementations of the present disclosure. Pixels and/or groups of pixels associated with objects and/or features in the input frames may be encoded using, for example, latency encoding described in co-owned U.S. patent application Ser. No. 12/869,583, filed Aug. 26, 2010 and entitled "INVARIANT PULSE LATENCY CODING SYSTEMS AND METHODS"; U.S. Pat. No. 8,315,305, issued Nov. 20, 2012, and entitled "SYSTEMS AND METHODS FOR INVARIANT PULSE LATENCY CODING"; U.S. patent application Ser. No. 13/152,084, filed Jun. 2, 2011, and entitled "APPARATUS AND METHODS FOR PULSE-CODE INVARIANT OBJECT RECOGNITION"; and/or latency encoding comprising a temporal winner take all mechanism described in U.S. patent application Ser. No. 13/757,607, filed Feb. 1, 2013, and entitled "TEMPORAL WINNER TAKES ALL SPIKING NEURON NETWORK SENSORY PROCESSING APPARATUS AND METHODS", each of the foregoing being incorporated herein by reference in its entirety.

In one or more implementations, object recognition and/or classification may be implemented using a spiking neuron classifier comprising conditionally independent subsets as described in co-owned U.S. patent application Ser. No. 13/756,372 filed Jan. 31, 2013, and entitled "SPIKING NEURON CLASSIFIER APPARATUS AND METHODS" and/or co-owned U.S. patent application Ser. No. 13/756,382 filed Jan. 31, 2013, and entitled "REDUCED LATENCY SPIKING NEURON CLASSIFIER APPARATUS AND METHODS", each of the foregoing being incorporated herein by reference in its entirety.

In one or more implementations, encoding may comprise adaptive adjustment of neuron parameters, such as neuron excitability which is described in U.S. patent application Ser. No. 13/623,820 entitled "APPARATUS AND METHODS FOR ENCODING OF SENSORY DATA USING ARTIFICIAL SPIKING NEURONS", filed Sep. 20, 2012, the foregoing being incorporated herein by reference in its entirety.

In some implementations, analog inputs may be converted into spikes using, for example, kernel expansion techniques described in co-owned U.S. patent application Ser. No. 13/623,842 filed Sep. 20, 2012, and entitled "SPIKING NEURON NETWORK ADAPTIVE CONTROL APPARATUS AND METHODS", the foregoing being incorporated herein by reference in its entirety. The term "continuous signal" may be used to describe a non-spiking signal (e.g., analog, n-ary digital signal characterized by n-bits of resolution, n>1). In one or more implementations, analog and/or spiking inputs may be processed by mixed signal spiking neurons, such as co-owned U.S. patent application Ser. No. 13/313,826 entitled "APPARATUS AND METHODS FOR IMPLEMENTING LEARNING FOR ANALOG AND SPIKING SIGNALS IN ARTIFICIAL NEURAL NETWORKS", filed Dec. 7, 2011, and/or co-owned U.S. patent application Ser. No. 13/761,090 entitled "APPARATUS AND METHODS FOR IMPLEMENTING LEARNING FOR ANALOG AND SPIKING SIGNALS IN ARTIFICIAL NEURAL NETWORKS", filed Feb. 6, 2013, each of the foregoing being incorporated herein by reference in its entirety.

In some implementations of robotic navigation in an arbitrary environment, the sensor component 106 may comprise a camera configured to provide an output comprising a plurality of digital image frames refreshed at, e.g., 25 Hz frame rate and/or other frame rate. Output of the sensor 106 in FIG. 1A may comprise representations of one or more objects (e.g., target 114, and/or obstacle 116). The sensor output may be processed by a feature detection apparatus, e.g., as described in U.S. patent application Ser. No. 14/542,391 entitled "ROBOTIC NAVIGATION APPARATUS AND METHODS", filed Nov. 14, 2014, incorporated supra. In one or more implementations of visual data processing, the features that may be detected in the sensory output may comprise one or more of representations (e.g., representations of objects, corner, edges, patches of texture, color, brightness, and/or other patterns that may be present in visual output), audio patterns (e.g., speech elements), and/or other persistent signal patterns that may be relevant to a given task. A given pattern and/or data item (e.g., representation of an orange fruit on a tree and/or time of day) may comprise a relevant feature for one task (e.g., harvesting of oranges) and may be ignored by other tasks (e.g., navigation around trees). Various feature detection methodologies may be applied to processing of the sensor output. In some implementations, the feature detection may be configured to implement one or more of a filter operation (e.g., orange mask to detect orange objects), a Radon transform edge detection, corner detection (e.g., using Harris operator), texture detection (e.g., using Laws masks), patterns of motion (e.g., using optical flow), and/or other methodologies.

Output of the feature detection may be utilized by the robot to perform a task. The tasks of the robot 100 may be configured based on a context. In one or more implementations, the context may comprise one or more of an occurrence of one or more features in the sensor output, one or more robot states, a state of the environment, environmental conditions, previous state information, and/or other information. Examples of a robot state may include one or more of location or motion information (e.g., position, orientation, speed, and/or other information), platform state or configuration (e.g., manipulator size, manipulator position, and/or other information), available power and/or other robot states. Examples of a state of the environment may include one or more of an object size, object location, and/or other states of the environment. Examples of environmental conditions may include information indicating whether there is one or more of wind, rain, and/or other environmental conditions. In some implementations, previous state information may be based on historic states of robot motions. The robotic apparatus 100 may be operated using an adaptive controller, e.g., such as described below with respect to FIGS. 2-5.

Figure 2:
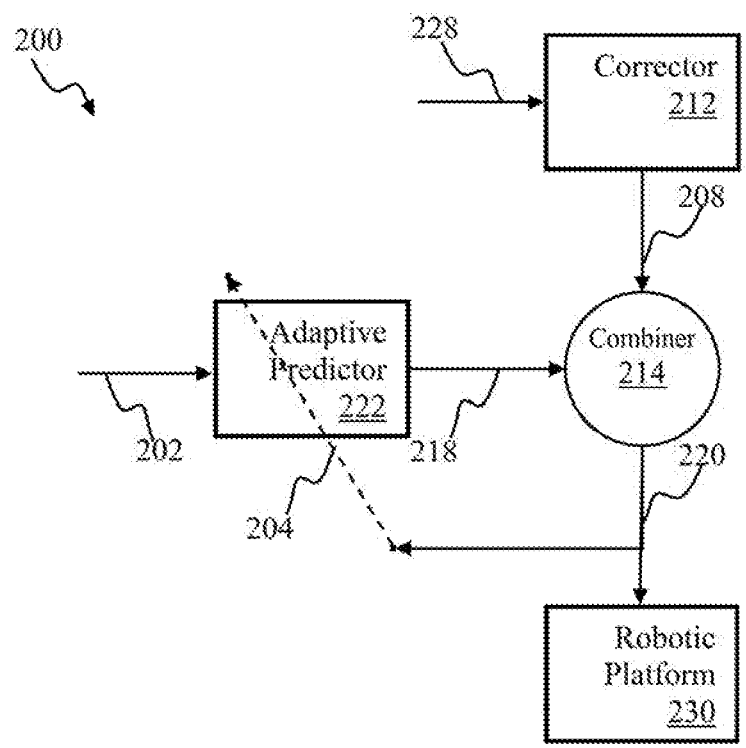
FIG. 2 is functional block diagram illustrating a robotic system comprising an adaptive predictor component, according to some implementations.
Figure 8:
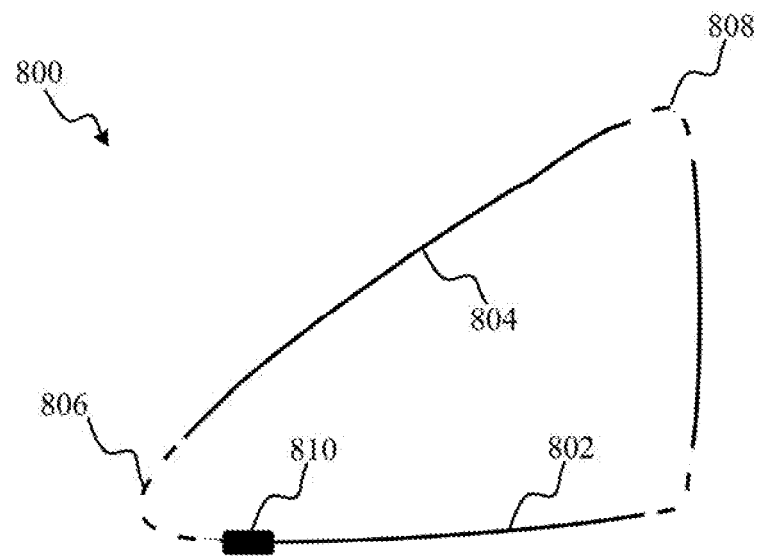
FIG. 8 is graphical illustration depicting navigation of an exemplary trajectory by a robotic vehicle configured for operation with the programming and training robotic control methodology of the disclosure, in accordance with one or more implementations

FIG. 2 illustrates an implementation of adaptive control system 200 for use with, e.g., the robotic apparatus 100 of FIG. 1A and/or 810 of FIG. 8. The adaptive control system 200 of FIG. 2 may comprise one or more of a corrector 212, an adaptive predictor 222, a combiner 214, and/or other components cooperating to control a robotic platform 230. The learning process of the adaptive predictor 222 may comprise one or more of a supervised learning process, a reinforcement learning process, an unsupervised learning process, and/or other processes. The corrector 212, the predictor 222, the combiner 214, and/or other components may cooperate to produce a control signal 220 for the robotic platform 230. In one or more implementations, the control signal 220 may comprise one or more motor commands (e.g., pan camera to the right, turn right wheel forward), sensor acquisition commands (e.g., use high resolution camera mode), and/or other commands.

In some implementations, the predictor 222 and the combiner 214 components may be configured to operate a plurality of robotic platforms. The control signal 220 may be adapted by a decoder component in accordance with a specific implementation of a given robotic platform 230. In one or more implementations of robotic vehicle control, the adaptation by the decoder may comprise translating binary signal representation 220 into one or more formats (e.g., pulse code modulation) that may be utilized by given robotic vehicle. U.S. patent application Ser. No. 14/244,890 entitled "LEARNING APPARATUS AND METHODS FOR CONTROL OF ROBOTIC DEVICES", filed Apr. 3, 2014 describes some implementations of control signal conversion.

In some implementations of the decoder corresponding to the analog control and/or analog corrector 212 implementations, the decoder may be further configured to rescale the drive and/or steering signals to a range appropriate for the motors and/or actuators of the platform 230.

In some implementations of the discrete state space control implementation of the corrector 212, the decoder may be configured to convert an integer control index into a corresponding steering/drive command using, e.g. a lookup table approach described in detail in, e.g., U.S. patent application Ser. No. 14/265,113 entitled "TRAINABLE CONVOLUTIONAL NETWORK APPARATUS AND METHODS FOR OPERATING A ROBOTIC VEHICLE", filed Apr. 29, 2014 ("the '113 application"), the foregoing being incorporated herein by reference in its entirety.

The corrector 212 may receive a control input 228 from a control entity. The control input 228 may be determined based on one or more of (i) sensory input 202 and (ii) feedback from the platform (not shown). In some implementations, the feedback may comprise proprioceptive signals. Examples of a proprioceptive signal may include one or more of feedback from servo motors, feedback from joint position sensors, torque resistance, and/or other proprioceptive signals. In some implementations, the sensory input 202 may correspond to the sensory input, described, e.g., with respect to FIGS. 1A-1C, supra. In one or more implementations, the control entity providing the input 228 to the corrector may comprise a human trainer, communicating with the robot via a remote controller (wired and/or wireless). In some implementations, the control entity may comprise a computerized agent such as a multifunction adaptive controller operable using reinforcement and/or unsupervised learning and capable of training other robotic devices for one and/or multiple tasks. In one such implementation, the control entity and the corrector 212 may comprise a single computerized apparatus.

The corrector 212 may be operable to generate control signal 208 using a plurality of approaches. In some implementations of analog control for robotic vehicle navigation, the corrector output 208 may comprise target vehicle velocity and target vehicle steering angle. Such implementations may comprise an "override" functionality configured to cause the robotic platform 230 to execute action in accordance with the user-provided control signal instead of the predicted control signal.

In one or more implementations of analog correction provision for robotic vehicle navigation, the control signal 208 may comprise a correction to the target trajectory. The signals 208 may comprise a target "correction" to the current velocity and/or steering angle of the platform 230. In one such implementation, when the corrector output 208 comprises a zero signal (or substantially a null value), the platform 230 may continue its operation unaffected.

In some implementations of state space for vehicle navigation, the actions of the platform 230 may be encoded using, e.g., a 1-of-10 integer signal, where eight (8) states may be used to indicate eight directions of motion (e.g., forward-left, forward, forward-right, left, right, back-left, back, back-right), one state may indicate "stay-still", and one state may indicate "neutral". The neutral state may comprise a default state. When the corrector outputs a neutral state, the predictor may control the robot directly. It will be appreciated by those skilled in the arts that various other encoding approaches may be utilized in accordance with controlled configuration of the platform (e.g., controllable degrees of freedom).

In some implementations of control for vehicle navigation, the action space of the platform 230 may be represented as a 9-element state vector, e.g., as described in, e.g., the above referenced the '113 application. Individual elements of the state vector may indicate the probability of the platform being subjected to (i.e., controlled within) a given control state. In one such implementation, output 218 of the predictor 222 may be multiplied with the output 208 of the corrector 212 in order to determine probability of a given control state.

The adaptive predictor 222 may be configured to generate predicted control signal $u^P$ 218 based on one or more of (i) the sensory input 202 and the platform feedback (not shown). The predictor 222 may be configured to adapt its internal parameters, e.g., according to a supervised learning rule, and/or other machine learning rules.

Some implementations in which a predictor comprises platform feedback may be employed in applications such as, for example, where: (i) the control action may comprise a sequence of purposefully timed commands (e.g., associated with approaching a stationary target (e.g., a cup) by a robotic manipulator arm), and/or where (ii) the platform may be characterized by platform state parameters (e.g., arm inertia, and/or motor response time) that change faster than the rate of action updates. Parameters of a subsequent command within the sequence may depend on the control plant state. A "control plant" may refer to the logical combination of the process being controlled and the actuator (often expressed mathematically). For example, control plant feedback might be the exact location and/or position of the arm joints which can be provided to the predictor.

In some implementations, the predictor 222 may comprise a convolutional network configured to predict the output 220 of the combiner 214 given the input 202. The convolutional network may be combined with other components that learn to predict the corrector signal given other elements of the sensory context. When the corrector 212 output comprises a zero signal (or null value), the combiner output 220 may equal the predictor output 218. When the corrector provides a non-zero signal, a discrepancy may occur between the prediction 218 and the output 220 of the combiner 214. The discrepancy may be utilized by the predictor 222 in order to adjust parameters of the learning process in order to minimize future discrepancies during subsequent iterations.

The sensory input and/or the plant feedback may collectively be referred to as sensory context. The sensory context may be utilized by the predictor 222 to produce the predicted output 218. By way of a non-limiting illustration, one exemplary scenario of obstacle avoidance by an autonomous rover uses an image of an obstacle (e.g., wall representation in the sensory input 202) combined with rover motion (e.g., speed and/or direction) to generate Context_A. When the Context_A is encountered, the control output 220 may comprise one or more commands configured to avoid a collision between the rover and the obstacle. Based on one or more prior encounters of the Context_A avoidance control output, the predictor may build an association between these events as described in detail below.

The combiner 214 may implement a transfer function h(x) where x includes the control signal 208 and the predicted control signal 218. In some implementations, the combiner 214 operation may be expressed, e.g., as described in detail in co-owned U.S. patent application Ser. No. 13/842,530 entitled "ADAPTIVE PREDICTOR APPARATUS AND METHODS", filed Mar. 15, 2013, as follows:

$$\hat{u} = h(u, u^P). \quad \text{(Eqn. 1)}$$

The transfer function of Eqn. 1 should not be viewed as limiting as other transfer functions and/or versions of Eqn. 1 may be utilized in some implementations. In some implementations, the transfer function may comprise one or more of addition, multiplication, union, a logical 'AND' operation, a logical 'OR' operation, and/or other transfer functions.

In one or more implementations, the transfer function may comprise a convolution operation, e.g., a dot product. In some implementations in which a spiking network is used with the combiner function, the convolution operation may be supplemented by use of a finite support kernel (i.e., a mapping function for linear space to a non-linear space) such as Gaussian, rectangular, exponential, and/or other process. In some implementations, a finite support kernel may implement a low pass filtering operation of input spike train(s). In some implementations, the transfer function h may be characterized by a commutative property.

In one or more implementations, the transfer function of the combiner 214 may be configured as follows:

$$h(0, u^P) = u^P. \quad \text{(Eqn. 2)}$$

In some implementations, the transfer function h may be configured as:

$$h(u, 0) = u. \quad \text{(Eqn. 3)}$$

In some implementations, the transfer function h may be configured as a combination of Eqn. 2-Eqn. 3 (or a similar expression) as:

$$h(0, u^P) = u^P, \text{ and } h(u, 0) = u, \quad \text{(Eqn. 4)}$$

In one exemplary implementation, the transfer function satisfying Eqn. 4 may be expressed as:

$$h(u, u^P) = (1-u) \times (1-u^P) - 1. \quad \text{(Eqn. 5)}$$

The combiner transfer function may be configured according to Eqn. 2-Eqn. 5, to implement additive feedback. In other words, output of the predictor (e.g., 218) may be additively combined with the control signal (408) and the combined signal 220 may be used as the teaching input (404) for the predictor. In some implementations, the combined signal 220 may be utilized as an input (context) into the predictor 222, e.g., as described in co-owned U.S. patent application Ser. No. 13/842,530 entitled "ADAPTIVE PREDICTOR APPARATUS AND METHODS", filed Mar. 15, 2013, incorporated supra.

In some implementations, the combiner transfer function may be characterized by a delay expressed as:

$$\hat{u}(t_{i+1}) = h(u(t_i), u^P(t_i)), \quad \text{(Eqn. 6)}$$

where $\hat{u}(t_{i+1})$ denotes combined output (e.g., 220 in FIG. 2) at time t+Δt.

As used herein, symbol $t_i$ may be used to refer to a time instance associated with individual controller update events (e.g., as expressed by Eqn. 6), for example $t_1$ denoting time of the first control output, e.g., a simulation time step and/or a sensory input frame step. In some implementations of training autonomous robotic devices (e.g., rovers, bi-pedaling robots, wheeled vehicles, aerial drones, robotic limbs, and/or other robotic devices), the update periodicity Δt may be configured to be between 1 ms and 1000 ms.

In some implementations, the combiner transfer function may be configured to implement override functionality (e.g., override combiner). The "override" combiner may detect a non-zero signal provided by the corrector, and provide a corrector signal as the combined output. When a zero (or no) corrector signal is detected, the predicted signal may be routed by the combiner as the output. In some implementations, the zero corrector signal may be selected as not a value (NaN). The non-zero signal may comprise a signal rather than the NaN.

In one or more implementations of a multi-channel controller, the corrector may simultaneously provide "no" signal on some channels and one or more signals on other channels, allowing the user to control one degree of freedom (DOF) of the robotic platform while the predictor may control another DOF.

It will be appreciated by those skilled in the art that various other transfer functions may be utilized with combiner 214. For example, in some implementations, the transfer function may include a Heaviside step function, a sigmoid function (e.g., hyperbolic tangent), Gauss error function, logistic function, a stochastic operation, and/or other transfer functions. Operation of the predictor 222 learning process may be aided by a teaching signal 204. As shown in FIG. 2, the teaching signal 204 may comprise the output 220 of the combiner 214. In some implementations wherein the combiner transfer function may be characterized by a delay (e.g., Eqn. 6), the teaching signal at time t; may be configured based on values of u, $u^P$ at a prior time $t_{i-1}$, for example as:

$$u^d(t_i)=h(u(t_{i-1}),u^P(t_{i-1})). \quad \text{(Eqn. 7)}$$

The training signal $u^d$ at time $t_i$ may be utilized by the predictor in order to determine the predicted output $u^P$ at a subsequent time $t_{i+1}$, corresponding to the context (e.g., the sensory input x) at time $t_i$:

$$u^P(t_{i+1})=F[x_i,W(u^d(t_i))]. \quad \text{(Eqn. 8)}$$

In Eqn. 8, the function W may refer to a learning process implemented by the predictor, e.g., a perceptron, and/or a look-up table.

In one or more implementations, such as illustrated in FIG. 2, the sensory input 206, the control signal 208, the predicted output 218, the combined output 220, and/or plant feedback may comprise spiking signals, analog signals, and/or a combination of spiking and analog signals. Analog to spiking and/or spiking to analog signal conversion may be effectuated using, mixed signal spiking neuron networks, such as, for example, described in co-owned U.S. patent application Ser. No. 13/313,826 entitled "APPARATUS AND METHODS FOR IMPLEMENTING LEARNING FOR ANALOG AND SPIKING SIGNALS IN ARTIFICIAL NEURAL NETWORKS", filed Dec. 7, 2011, and/or co-owned U.S. patent application Ser. No. 13/761,090 entitled "APPARATUS AND METHODS FOR IMPLEMENTING LEARNING FOR ANALOG AND SPIKING SIGNALS IN ARTIFICIAL NEURAL NETWORKS", filed Feb. 6, 2013, incorporated supra.

Output 220 of the combiner e.g., 214 in FIG. 2 may be gated. In some implementations, the gating information may be provided to the combiner by the corrector 212 using, e.g., an "override" indication in order to cause the robotic platform 230 to execute actions according to the user-provided control instead of the predicted control signal.

In some implementations of spiking controller output, the control signal 208 may comprise positive spikes indicative of a control command. The control signal 208 may be configured to be combined with the predicted control signal (e.g., 218). The control signal 208 may comprise negative spikes. The timing of the negative spikes may be configured to communicate the control command. The (negative) amplitude sign may be configured to communicate the combination inhibition information to the combiner 214 to enable the combiner to 'ignore' the predicted control signal 218 for constructing the combined output 220.

In some implementations of spiking signal output, the combiner 214 may comprise a spiking neuron network. The control signal 208 may be communicated via two or more connections. One such connection may be configured to communicate spikes indicative of a control command to the combiner neuron. The other connection may be used to communicate an inhibitory signal to the combiner network. The inhibitory signal may inhibit one or more neurons of the combiner the one or more combiner input neurons of the combiner network thereby effectively removing the predicted control signal from the combined output (e.g., 220 in FIG. 2).

The gating information may be provided to the combiner by another entity (e.g., a human operator controlling the system with a remote control and/or external controller) and/or from another output from the corrector 212 (e.g., an adaptation block, an optimization controller). In one or more implementations, the gating information may comprise one or more of a command, a memory address of a register storing a flag, a message, an inhibitory efficacy, a value (e.g., a weight of zero to be applied to the predicted control signal by the combiner), and/or other information capable of conveying gating instructions to the combiner.

The gating information may be used by the combiner network to inhibit and/or suppress the transfer function operation. The suppression (or 'veto') may cause the combiner output (e.g., 220) to be comprised solely of the control signal portion 218, e.g., configured in accordance with Eqn. 3. In one or more implementations the gating information may be used to suppress ('veto') provision of the context signal to the predictor without affecting the combiner output 220. In one or more implementations, the gating information may be used to suppress ('veto') the feedback from the platform.

In one or more implementations, the gating signal may comprise an inhibitory indication that may be configured to inhibit the output from the combiner. Zero combiner output may cause zero teaching signal (e.g., 214 in FIG. 2) to be provided to the predictor so as to signal to the predictor a discrepancy between the target action (e.g., controller output 208) and the predicted control signal (e.g., output 218).

The gating signal may be used to veto predictor output 218 based on, for example, the predicted control output 218 being away from the target output by more than a given margin. The margin may be configured based on an application and/or state of the trajectory. For example, a smaller margin may be applicable in navigation applications wherein the platform is proximate to a hazard (e.g., a cliff) and/or an obstacle. A larger error may be tolerated when approaching one (of many) targets.

In one or more implementations, the gating/veto functionality may be implemented on a "per-channel" basis in a multi-channel controller wherein some components of the combined control vector may comprise predicted components, while some components may comprise the corrector components.

By way of a non-limiting illustration, if the turn is to be completed and/or aborted (e.g., due to a trajectory change and/or sensory input change), and the predictor output still produces turn instructions to the plant, the gating signal may cause the combiner to veto (ignore) the predictor contribution and pass through the controller contribution.

Predicted control signal 218 and the control input 208 may be of opposite signs. In one or more implementations, a positive predicted control signal (e.g., 218) may exceed the target output that may be appropriate for performance of as task. The control signal 208 may be configured to include negative signaling in order to compensate for over-prediction by the predictor.

Gating and/or sign reversal of controller outputs may be useful, for example, where the predictor output is incompatible with the sensory input (e.g., navigating towards a wrong target). Rapid changes in the environment (e.g., as compared to the predictor learning time scale caused by appearance of a new obstacle, target disappearance, and/or other changes), may require an "override" capability for the controller (and/or supervisor) to 'override' predictor output. In one or more implementations, compensation for over-prediction may be controlled by a graded form of the gating signal.

Figure 3:
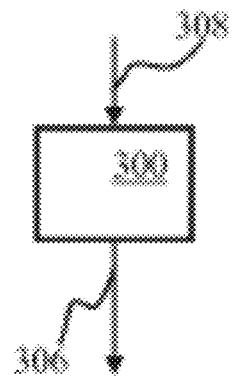
FIG. 3 is a block diagram illustrating an unattended robotic controller configured to determine a control output based on sensory input, according to one or more implementations.

FIG. 3 illustrates an unattended robotic controller apparatus configured to determine a control output based on sensory input, according to one or more implementations. The apparatus 300 of FIG. 3 may operate an unsupervised control process configured based on software application (e.g., programmed), a learned configuration (e.g., table and/or array of weights determined during training), and/or other control process operable without training input from human and/or computerized training entity.

The apparatus 300 may be configured to receive context 308 and to produce control output 306. In one or more implementations, the context 308 may comprise sensory input, e.g., 202, described above with respect to FIG. 2. The output 306 may comprise one or more of motor commands (e.g., voltage, force, torque, and/or other commands represented as discrete and/or continuous values), action indications, e.g., as described in Ser. No. 13/842,616 entitled "ROBOTIC APPARATUS AND METHODS FOR DEVELOPING A HIERARCHY OF MOTOR PRIMITIVES", filed Mar. 15, 2013, the foregoing being incorporated herein by reference in its entirety. The term "action indication" may be used to describe an instruction, a memory value, a signal, and/or another indication mechanism configured to convey a higher level control directive. The higher level control directive may not be directly communicated to the motor but rather may serve as an action directive to another component of the control system (e.g., the predictor 222 and/or a combiner 214 in FIG. 2). In one or more implementations, the action indication may comprise, for example, a directive. Examples of a directive may include one or more of "turn", "move ahead", "turn left", "turn right", and/or other directives. In some implementations, the control system may utilize a hierarchy of action indications, ranging from less complex/more specific (e.g., turn, move, and/or other instructions) to more abstract (e.g., approach, avoid, fetch, park, grab, and/or other instructions).

In some implementations, training a predictor (e.g., 222) to produce a control output may be combined with a predictor operating using an unattended (e.g., programmed, pre-trained) process (e.g., the component 300) in a hybrid control process. The unattended (e.g., programmed, pre-trained) process may also be referred to as a "reflex".

Figure 4A:
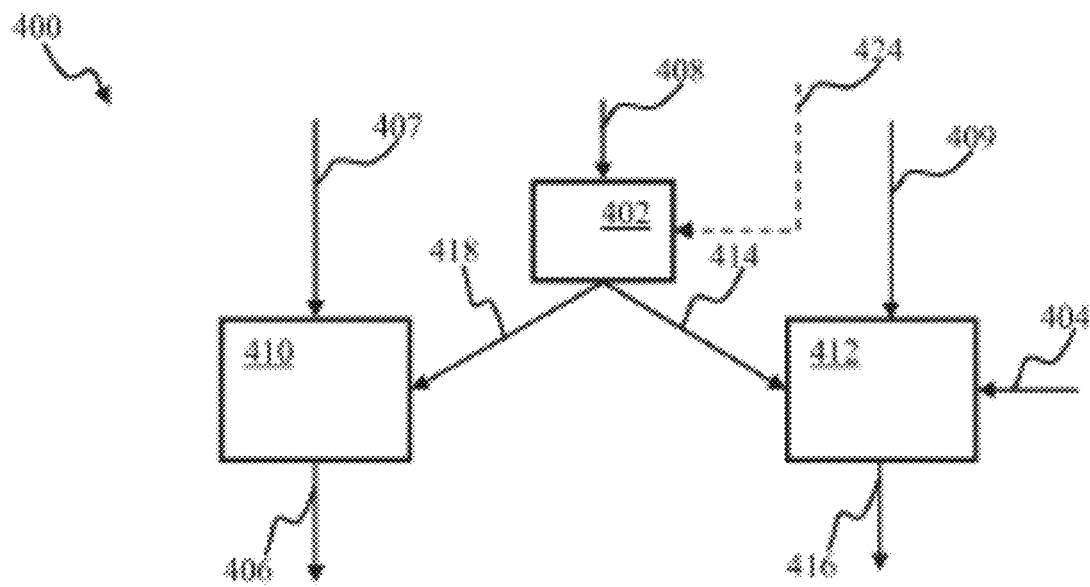
FIG. 4A is a block diagram illustrating a hybrid controller apparatus comprising a switching component, according to one or more implementations.

FIG. 4A illustrates use of a hybrid control methodology with a robotic controller apparatus configured to determine a control output based on sensory input, according to one or more implementations. Apparatus 400 of FIG. 4A may comprise a switching component 402 coupled to predictor components 410, 412. The components 402, 410, 412 may be configured to receive sensory information 407, 408, 409, respectively. In one or more implementations, the sensory input 407, 408, 409 may comprise all or a portion of sensory information available to the apparatus 400. In some implementations, the sensory information may comprise, e.g., the input 202 described above with respect to FIG. 2. By way of an illustration, the sensory input 407, 408, 409 may comprise data from one or more sensors (audio, video, range, acoustic, IR, structured light, LiDAR, radio frequency, positioning, inertial, environmental, and/or other sensors) characterizing robotic apparatus and/or its environment, state (feedback) of the robotic platform (e.g., motor torque, motor position, motor load, battery current draw, battery voltage, position of actuators and/or controllable elements (e.g., rotor blade, rudder, wheel), and/or other parameters). In some implementations of a learning controller for home animation, the sensory information may comprise ambient environment data (e.g., temperature, humidity, pressure, daylight, and/or other environmental data), inputs from appliances (e.g., valves, doors, locks, light switches, light fixture status, entertainment components, and/or other appliances), and/or other data. In some implementations, the sensory data may comprise pre-processed data e.g., edges, color patches obtained from camera data, platform speed, tilt obtained from inertial measurements, and/or other processed data.

In one or more implementations, individual ones of the sensory inputs 407, 408, 409 may be configured different from one another, e.g., comprising a subset of the available sensory information. By way of an illustration of target search and manipulation application, a robotic platform may comprise a navigation sensor (e.g., camera, LiDAR, ultrasonic range sensor, and/or other navigation sensor) configured to provide information to a navigation component (e.g., pre-programmed predictor 410) used to operate the platform during path following, target search, and/or target approach task. The platform may further comprise a manipulator supporting another sensor (e.g., gripper mounted camera) useful for providing sensory information to a learning predictor for grasping the target. The information 407 may comprise navigation sensor output. The information 409 may comprise data provided by the gripper camera, position, and/or orientation of the manipulator, and/or other information.

Predictor components 410, 412 may be configured to determine control output (406, 416, respectively) based on the sensory input (407, 409, respectively). The predictor component 410 may be configured to operate an unattended control process. Examples of such an unattended control process may include one or more of a programmed process, a pre-trained process, and/or otherwise configured process that may be operable without input from a trainer. Examples of a process operable without input from a trainer may include random exploration based on visual input, obstacle avoidance based on distance sensor and visual input as described above with respect to FIG. 3, and/or other processes.

In some implementations of self-stabilized camera support, the predictor component 410 may be configured to implement a stabilization behavior wherein a camera module mounted on an arm is stabilized (e.g., kept pointing in a given direction at a given elevation). The component 410 may be configured to produce control output for joints of the arm in order to maintain camera orientation.

The predictor component 412 may be configured to operate a learning control process configured based on a teaching signal 404 from an external (e.g., with respect to the entity 412). In some implementations, the component 412 may comprise the adaptive predictor 222 described above with respect to FIG. 2. The teaching input may comprise an output of a combiner component (e.g., the output 204 in FIG. 2) configured based on a training input (208 in FIG. 2). In one or more implementations of robotic vehicle navigation, the training signal 404 may comprise target vehicle velocity and/or target vehicle steering angle. Such implementations may comprise an "override" functionality configured to cause a robot to execute action in accordance with the trainer-provided control signal instead of the predicted control signal. In some implementations, the training signal 404 may comprise a correction (an increment/decrement) to vehicle velocity and/or direction, and/or other parameters.

In some implementations, the training signal 404 may comprise desired motor velocity for motors operating a robotic arm while training a controller to lift the arm once an object is in the gripper. In one or more implementations of training a Baxter robot (available from Rethink Robotics™), the training signal may comprise a 7 dimensional vector consisting of target position and/or velocity of the motors for operating joints of the Baxter arm. Velocity information may be used as the training signal when the Baxter arm needs to be rotated relative to the direction of a target object that the arm gripper is about to pick up.

Figure 4B:
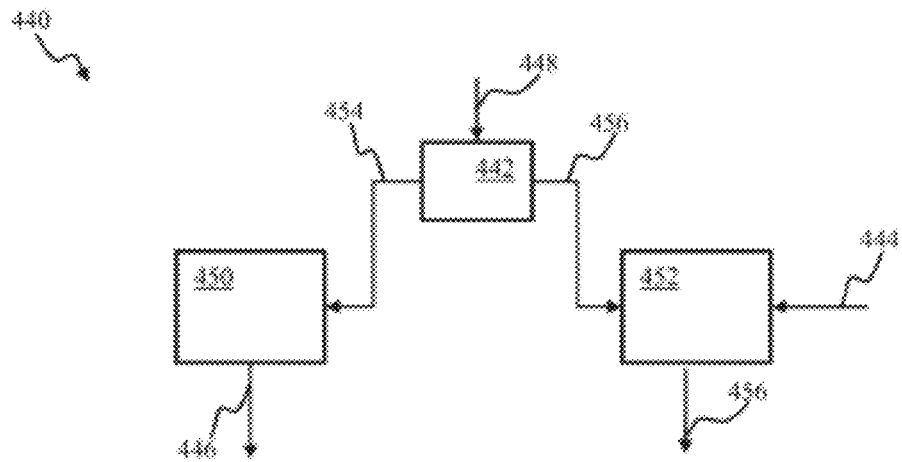
FIG. 4B is a block diagram illustrating a hybrid robotic controller apparatus comprising input switching, according to one or more implementations.
Figure 4C:
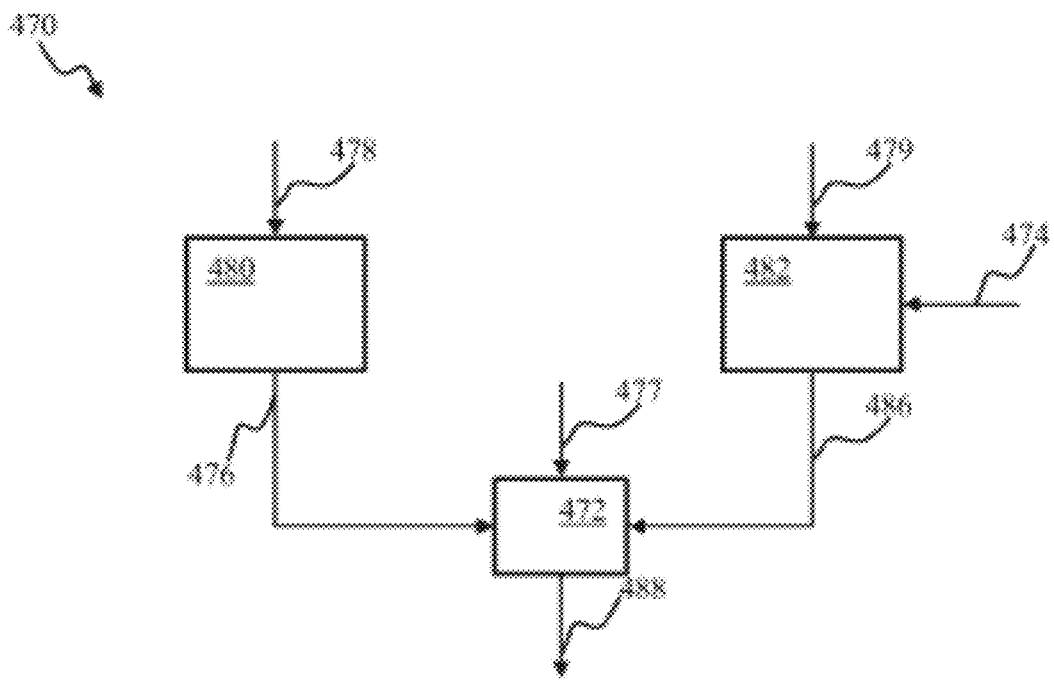
FIG. 4C is a block diagram illustrating a hybrid robotic controller apparatus comprising output switching, according to one or more implementations.

The controller configuration comprising a trained and an unattended predictor components (e.g., as illustrated in FIGS. 4A-4C) may be referred to as the hybrid controller and/or hybrid configuration.

FIG. 8 illustrates use of a hybrid control approach for controlling navigation of trajectory by a robotic vehicle. In FIG. 8, the robotic vehicle 810 may be configured to follow the trajectory 800. The trajectory 800 may comprise one or more straightaway portions (802, 804) and one or more turns (806, 808). The vehicle 810 may comprise a hybrid controller, e.g., 400 shown and described with respect to FIG. 4A. The vehicle 810 may comprise one or more sensors configured to communicate information related to vehicle position (e.g., with respect to the track), vehicle motion (e.g., orientation, velocity, acceleration), wheel traction, wheel position, brake status, motor speed, torque, and/or other parameters.

By way of an illustration, in one or more implementations, the predictor component 410 of apparatus 400 may be configured to provide one or more control signals to navigate the vehicle 810 along a straight portions (e.g., segments 802, 804) of the trajectory 800 in FIG. 8). Output 406 of the predictor 410 may be configured based on sensory input 407 (e.g., vehicle speed, position, and/or other parameters).

The predictor component 412 may be configured to provide one or more control signals to navigate a robotic vehicle (e.g., 100 in FIG. 1A, 140, 142 in FIG. 1B, and/or 810 in FIG. 8) along turns (e.g., segments 806, 808 of the trajectory 800 in FIG. 8). Output 416 of the predictor 412 may be configured based on the sensory input 409 and the training input 404. In one or more implementations, the training input 404 may comprise indication from the trainer to slow down, speed up, wheel orientation, and/or other navigation instructions.

In some implementations, the predictor component 410 may be configured to enable navigation of an exemplary trajectory by the vehicle 810 at a given speed based on a pre-programmed navigation controller provided by, e.g., a manufacturer of the vehicle 810. The predictor component 412 may be configured to be trained by a user to navigate the vehicle 810 along the trajectory in a shorter time and/or with smaller deviations from the trajectory. It will be appreciated by those skilled in the arts that above examples of operating predictors 410, 412 are exemplary and various other applications may be employed, such as, refuse location and pickup.

The switching component 402 may be configured to determine controller mode of operation, (e.g., the reflexive predictor 410 or the learning predictor 412). Operation of the switching component may be configured based on the sensory input 408. In some implementations, the sensory input 408 may comprise all or a portion of sensory input 407, 409 provided to the predictor components 410, 412. By way of illustration of one such implementation of a robotic manipulator operable to replace a light bulb, the switching component may enable a user to operate the learning predictor 412 in order to provide control signal 416 for approaching the light bulb with the grasping component of the manipulator. The switching component 402 may utilize visual, position, and/or other sensors in order to determine location of the grasping component relative the light bulb. Upon the grasping component being proximate the light bulb, the switching component 402 may select the reflex predictor 410 in order to provide control signal 404 for grasping the light bulb with the grasping component of the manipulator.

The switching component 402 may be configured based on a fixed (e.g., non-learning) process and/or a learning process. In some implementations, the component 402 process may comprise one or more of a pre-programmed process, a previously trained process, a pre-configured adaptive process (e.g., Kalman filter), a learning process (e.g., using one or more of supervised, reinforcement learning approaches), and/or other processes.

In one or more implementations of a pre-programmed switcher 402, the switching operation may be configured based on an input from a proximity sensor. The component 410 may be activated responsive to the proximity input (e.g. distance to an object) breaching a threshold. The component 412 may be activated responsive to the proximity input failing to breach the threshold.

By way of an illustration of target location and pick up application, switching component may be used to select between search behaviors and grasp behaviors. The search behavior may be configured based on a pre-configured process (e.g., component 410) wherein the robot may randomly explore the environment in order to locate target(s). The component 412 may be user to learn approach and grasp behavior. The switching operation may be effectuated based on visual input wherein the pre-programmed (random exploration) behavior may be executed if a target is not visible (in visual field). Trained behavior (approach and grasp target) may be executed if target is visible. The switching component 402 may be operable in accordance with learning or programmed process.

In some implementations, operation of the component 402 may be configured based on a learning process. The learning process may be configured based on the training input 424. By way of an illustration of a refuse collection application by an autonomous robot comprising a manipulator, the training input may comprise an image of an object (e.g., a piece of refuse) in the manipulator griper. Upon detecting a presence of the object in the gripper, the switching component 402 may learn to select a pre-trained "deliver to base" behavior (e.g., component 410). The object may be placed in to a basket and/or the robot may navigate to the basket (base). In absence of the object in the gripper, the component 402 may select learning behavior (e.g., component 412) wherein the component 412 object may be trained to grasp a target.

In some implementations, training input 424 may be the output of a target tracker, where the output comprises an (x,y) coordinate representing location of a target object in the visual space. The switching component 402 may be trained to switch based on the location of the target object (e.g., if close-by in front, then perform grasping; if far in the visual field, then approach; if target not in the visual field, then search, end/or other implementations).

In one or more implementations, the input 408 into the switching component 402 may comprise input distinct from the inputs 407, 409. By way of an illustration, wherein the apparatus 400 functionality may be embodied within a portable battery-operated device characterized by limited computational and/or energy (e.g., battery), the switching component 402 may select operation of the apparatus 400 based on the reflexive predictor 410. In some implementations, operating the reflexive predictor may be characterized by lower energy use compared to the learning predictor (e.g., due to fewer computations being performed). Accordingly, selection of the predictor 410 by the switching component 402 may extend autonomous operation of a battery powered device being controlled by the controller apparatus 400. The apparatus 400 may be embodied in a device comprising sufficient energy resource for operating learning predictor component 412 and/or used in an application that may benefit from training (e.g., visual based path following with obstacle avoidance in a novel environment where the newness of the environment makes it difficult to pre-program the desired behavior). The apparatus 400 may be embodied in a toy-animator where a child may train an inexpensive IR and/or radio controlled toy to perform a target action that has not been previously programmed into the toy, but trained by the child (e.g., training of a ball fetch behavior, and/or other behaviors). The switching component 402 may select operation of the component 412. The input 408 may comprise platform configuration (e.g., battery powered), current energy use, remaining energy, and/or other parameters.

The selection of the components 412, 410 may be effectuated based on indications 414, 418, respectively. In one or more implementations, the indications 414, 418 may comprise a message, a logic state (e.g., ON/OFF, HI/LO and/or other), a value in a register, a continuous valued signal (e.g., voltage), a spike, a pulse, a code, and/or other method of communicating state information.

Figure 1B:
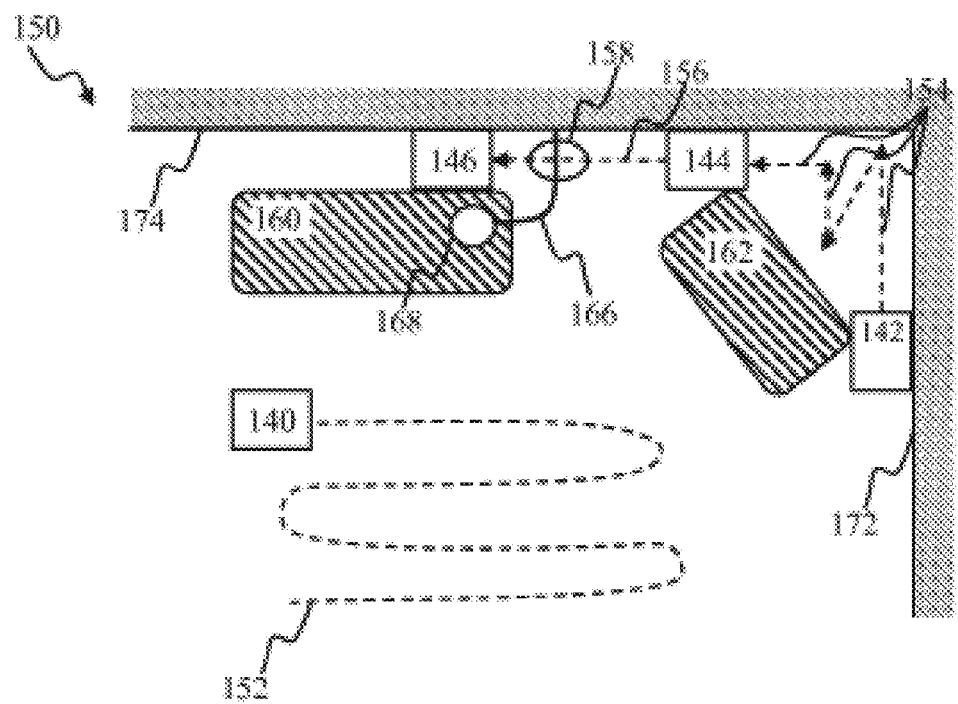
FIG. 1B is a graphical illustration depicting training and/or operation of a robotic vacuum cleaning apparatus comprising an adaptive controller, in accordance with one or more implementations.

In some implementations, the component 410 may be configured to operate a pre-programmed process configured for random exploration of an environment by a robotic device (e.g., the apparatus 100 in FIG. 1A and/or 140 in FIG. 1B). The component 412 may be configured to operate a learning target approach process, e.g., as described in U.S. patent application Ser. No. 13/928,775, filed Jun. 27, 2013 and entitled "ACTION SELECTION APPARATUS AND METHODS", the foregoing being incorporated herein by reference in its entirety. The switching component 202 may enable the robotic device to execute the exploration behavior (by the component 410) when target (e.g., 114 in FIG. 1A) is not being detected and/or present in the sensory data; once the target is detected, the switching component may switch to execution of the target approach by the component 412.

In one or more implementations of a target collection behavior (e.g., trash collecting robot, security robot and/or other), the robot may be configured to search for one or more targets, approach one or more targets, grasp one or more targets, and/or otherwise focus efforts on one or more targets. The component 410 may be configured to enable random exploration of the environment. The component 412 may be configured to learn target approach and/or grasp behaviors. Operation of the switching component 402 may be configured based on visual input. Responsive to determining that the target is not present (in visual field). The component 402 may produce indication 418 configured to cause the apparatus 400 to execute exploration behavior. Responsive to determining that the target is present, the component 402 may produce indication 416 configured to cause the apparatus 400 to execute approach/grasp behavior. The decision making by the component 402 may be either based on a learning process and/or on a pre-programmed process.

In one implementation of memoryless switching process, the switching determination may be performed when a new input 408 may arrive to the component 402 independently of the previous decision.

In some implementations, the switching component 402 may be trained to produce output 418, 414 or to maintain a prior selection. By way of an illustration, if, for an input 408 at time T, the switching component indicates 'no change', then the component 402 output may remain assigned to the output obtained at time T−1<T.

In one or more implementations, the switching output at time T may be configured (biased by) based on the prior selections. Such bias may be implemented using an increasing and decaying temporal component as follows:
- baseline probability of selecting the output 418 is equal to probability of selecting the output 414;
- if for an input at time T the output 418 may be selected, then probability p(418) of selecting the output 418 may be increased;
- selection probabilities p(418) and p(414) may decay back to their baseline, e.g., following an exponential decay of a half-life of tau;
- at a given time T decision whether to route/select 418 or 414 may be configured based on the input 408 and current values of the probabilities p(418), and p(414).

The time constant tau may be configured to determine time scale for the bias. In some implementations of navigating a household robotic vacuum at speeds between 0.1 m/s and 2 m/s, the bias timescale may be selected between 0.1 s and 1 s.

In some implementation, the switching process of the component 402 may be configured to determine confidence information (e.g., percent good). High confidence may be configured override bias information. Lower confidence may be used to be combined with bias values p(418) and p(414) to make a probabilistic selection.

In some implementations, a robotic vacuum cleaner may be configured to perform vacuuming operation of the environment while following a given path. The robotic vacuum cleaner may be configured to approach and engage to a docking/charging station when the station is available and/or the robot battery may be below a threshold (e.g., voltage below 12.5 V for 14.4 V battery, remaining charge is below 15% level, and/or other condition).

The component 402 may be configured to monitor battery voltage and/or detect a charging station. Upon detecting a target condition (e.g., low voltage and/or charging station in a proximity of 3 m), the component 402 may produce the indication 418 configured to cause the apparatus 400 to execute approach and dock behavior in order to charge the battery of the robotic vacuum. In some implementations, the charging station detection may be configured based on analysis by the component 402 of video signal obtained by the robotic vacuum, and/or a beacon signal of the docking station (e.g., RF, ultrasonic, IR and/or other signal).

When in vacuum mode of operation, the component 402 may be configured to select trained behavior via the indication 414 thereby causing the robotic vacuum to cover area of the environment using, e.g., a given pattern (e.g., corn-row). The component 402 may be configured using a preprogrammed process.

FIG. 4B illustrates a hybrid robotic controller apparatus comprising input switching, according to one or more implementations. Apparatus 440 of FIG. 4B may comprise a switching component 442 coupled to predictor components 450, 452. The component 442 may be configured to receive sensory information 448. In one or more implementations, the sensory input 448 may comprise, e.g., the input 202 described above with respect to FIG. 2 and/or sensory input described above with respect to FIGS. 1A-1B, and/or FIG. 4A.

The switching component 442 may be configured to determine mode of operation, (e.g., the reflexive predictor 450 or the learning predictor 452) of the controller 440. Operation of the switching component 442 may be configured based on the sensory input 448. In some implementations, the sensory input 448 may comprise information related to configuration of a robotic device being controlled by the apparatus 440. By way of an illustration wherein the controller 440 functionality may be embodied within a portable battery-operated device characterized by limited computational and/or energy (e.g., battery), the switching component 442 may select operation of the controller 440 based on the reflexive predictor 450. In some implementations, operating the reflexive predictor may be characterized by lower energy use compared to the learning predictor (e.g., due to fewer computations being performed). Accordingly, selection of the predictor 450 by the switching component 442 may extend autonomous operation of a battery powered device being controlled by the controller apparatus 440. When the controller 440 may be embodied in a device comprising sufficient energy resource for operating learning predictor component 452 and/or used in an application that may benefit from training, the switching component 442 may select operation of the component 452. Responsive to selecting component 450 or 452, the switching component 442 may route the sensory input 448 to the respective component (e.g., 450, 452) via pathways 454, 456, respectively). In one or more implementations, information provided via pathways 454, 456 may comprise one or more subsets of the input 448.

Predictor components 450, 452 may be configured to determine control output (446, 456, respectively) based on the sensory input (454, 456, respectively). The predictor component 450 may be configured to operate an unattended control process, e.g., such as described above with respect to FIGS. 3-4A.

The predictor component 452 may be configured to operate a learning control process configured based on a training signal 444 from an external (e.g., with respect to the entity 452). In some implementations, the component 412 may comprise the adaptive predictor 222 and/or 412 described above with respect to FIGS. 2 and/or 4A. The teaching input 444 may comprise an output of a combiner component (e.g., the output 204 in FIG. 2) configured based on a training input (208 in FIG. 2). In one or more implementations of robotic vehicle navigation, the training signal 444 may comprise target vehicle velocity and/or target vehicle steering angle.

FIG. 4C illustrates a hybrid robotic controller comprising control output switching, according to one or more implementations. Apparatus 470 of FIG. 4C may comprise a converter component 472 coupled to predictor components 480, 482. The components 472, 480, 482 may be configured to receive sensory information 477, 478, 479, respectively. In one or more implementations, the sensory input 477, 478, 479 may comprise all or a portion of sensory information available to the apparatus 470. In some implementations, the sensory information may comprise, e.g., the input 202 described above with respect to FIG. 2. By way of an illustration, the sensory input 477, 478, 479 may comprise data from one or more sensors (audio, video, range, acoustic, IR, structured light, LiDAR, radio frequency, positioning, inertial, environmental, and/or other sensors) characterizing robotic apparatus and/or its environment, state (feedback) of the robotic platform (e.g., motor torque, motor position, motor load, battery current draw, battery voltage, position of actuators and/or controllable elements (e.g., rotor blade, rudder, wheel), and/or other parameters). In some implementations of a learning controller for home animation, the sensory information may comprise ambient environment data (e.g., temperature, humidity, pressure, daylight), inputs from appliances such as valves, doors, locks, light switches, light fixture status, entertainment components, and/or other data. In some implementations, the sensory data may comprise pre-processed data e.g., edges, color patches obtained from camera data, platform speed, tilt obtained from inertial measurements, and/or other processed data. In some implementations, the sensory information (e.g., 477) may comprise information related to configuration of a robotic device (e.g. battery operated) being operated by the apparatus 470 and/or information related to task being performed (e.g., target approach, obstacle avoidance, and/or other tasks).

In one or more implementations, individual ones of the sensory inputs 477, 478, 479 may be configured different from one another, e.g., comprising a subset of the available sensory information, e.g., such as described with respect to FIG. 4A above. By way of an illustration of operating a mobile platform comprising a manipulator, the input 478 may comprise gripper camera input. The process 480 may be configured to provide data to motors controlling the gripper. The input 479 may comprise LiDAR output and forward facing camera output. The component 482 may provide output for controlling motors that propel the platform (e.g., the wheels or tank-threads).

Predictor components 480, 482 may be configured to determine control output (476, 486, respectively) based on the sensory input (478, 479, respectively). The predictor component 480 may be configured to operate an unattended control process, e.g., comprising a programmed, a pre-trained and/or otherwise pre-configured process that may be operable without input from a trainer, e.g., as described above with respect to FIG. 3.

The predictor component 482 may be configured to operate a learning control process configured based on a teaching signal 474 from an external source (e.g., with respect to the entity 482). In some implementations, the component 412 may comprise the adaptive predictor 222 described above with respect to FIG. 2. The teaching input 474 may comprise an output of a combiner component (e.g., the output 204 in FIG. 2) configured based on a training input (208 in FIG. 2) and predictor output (218 in FIG. 2). In one or more implementations of robotic vehicle navigation, the training signal 474 may comprise target vehicle velocity and/or target vehicle steering angle. In such implementations the combiner (214 in FIG. 2) and the training input (208 in FIG. 2) may be configured such that the training input may comprise an "override" information configured to cause the robotic platform (e.g., 230 in FIG. 2)

to execute action in accordance with the trainer-provided control signal (e.g., 208) rather than with the predicted control signal (e.g., 218). In some implementations, the training signal 474 in FIG. 4C may comprise a correction (an increment/decrement) to vehicle velocity and/or direction, and/or other parameters). Such additive (increments/decrements) may be be combined with predictor output (218 in FIG. 2) in the combiner (214 in FIG. 2), which then provides commands (signal 220 in FIG. 2) to robotic body (230 in FIG. 2). In some implementations, training signal may consist of desired position of a multi-joined arm (e.g., on a Baxter robotic platform). In some implementations, training signal may consist of desired speed of a wheeled robot (e.g., in the salmon algorithm the direction/orientation of the robot is determined based on programmed behavior, but the speed is trained).

Output 476, 486 of the predictor components 480, 482 may be provided to the converter component 472. Operation of the component 472 may be based on a pre-configured or learning process, e.g., as described above with respect to the switching component 402, 442 of FIGS. 4A-4B. In some implementations, the component 472 may be configured to produce output 488 based on a selection of one of the inputs 476, 486.

Predicted outputs 476, 486 may comprise confidence information and a motor control information. The component 472 may be configured to select the output 488 based on the motor control information (e.g., 476 or 486) characterized by higher confidence.

In some implementations, the component 472 may be configured to sample (e.g., a value from one the predicted outputs 476, 486) with the probability defined by the confidence signal associated with the outputs 476, 486, respectively.

In some implementations the component 472 may be configured determine the output 488 by determining a distributions of the predicted outputs (476, 486) and the output 488 over a time window. For a given current predictor output (e.g., 476 or 486), the probability/likelihood that the output is coming from one of the distributions is calculated. The respective probability may be used to determine the prediction confidence.

In some implementations, the component 472 may be configured to combine the predicted outputs 476, 486 in order to produce the output 488. Various combination implementations may be utilized, e.g., a mean, a weighted average using normalized prediction confidence such as:

output_488=confidence_476×value_476+confidence_486×value_486, where confidence_of_{476,486} may be configured in a range from 0 to 1, inclusive; and confidence_of_476+confidence_of_486=1.    (Eqn. 9)

In one or more implementations, the component 472 may be configured to produce the output 488 based on a combination (e.g., a concatenation) of the inputs 476, 486. By way of an illustration of operating a robotic device characterized by a plurality operational degrees of freedom (DOF), output 476 may comprise control signal configured to operate a portion of the DOF (e.g., an actuator controlling forward/backward motion of a vehicle), the output 484 may comprise control signal configured to operate another portion of the DOF (e.g., an actuator controlling left/right motion of the vehicle). The component 480 may be configured to selectively combine the data streams 474, 484 to produce the output 488. In some implementations of reduced degree of freedom operation, the output 488 may be configured based on one of the data streams 474 or 484, e.g., as described in detail in U.S. patent application Ser. No. 14/070,239 "REDUCED DEGREE OF FREEDOM ROBOTIC CONTROLLER APPARATUS AND METHODS", filed Nov. 1, 2013, and/or Ser. No. 14/070,269 "APPARATUS AND METHODS FOR OPERATING ROBOTIC DEVICES USING SELECTIVE STATE SPACE TRAINING", filed Nov. 1, 2013, incorporated supra.

Figure 10:
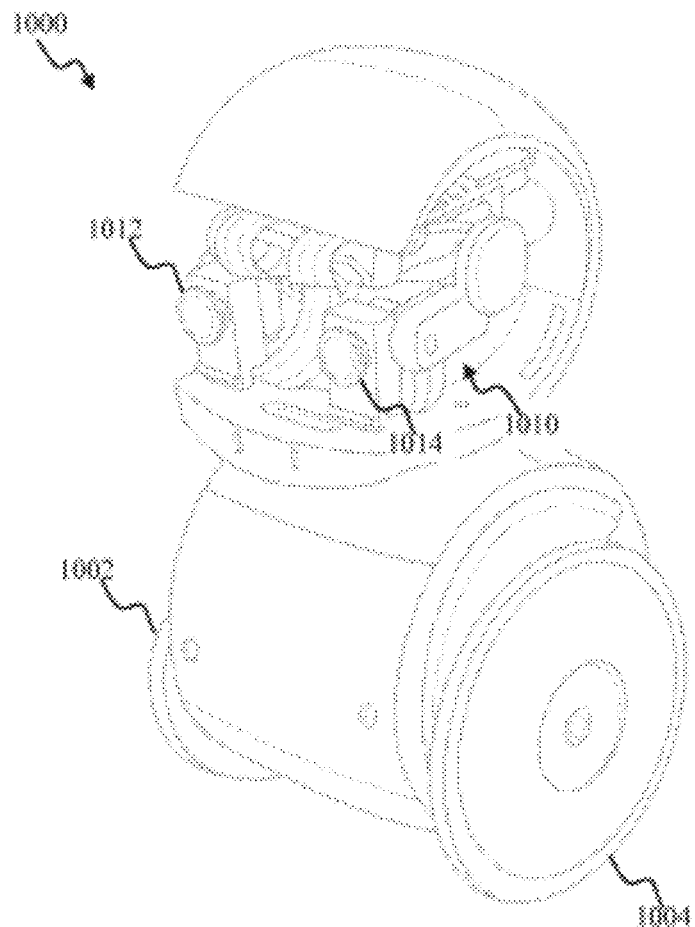
FIG. 10 is an isometric view of EyeRover™ robotic apparatus comprising articulated camera component and configured for use with the programming and training robotic control methodology of the disclosure, in accordance with one or more implementations.
Figure 11:
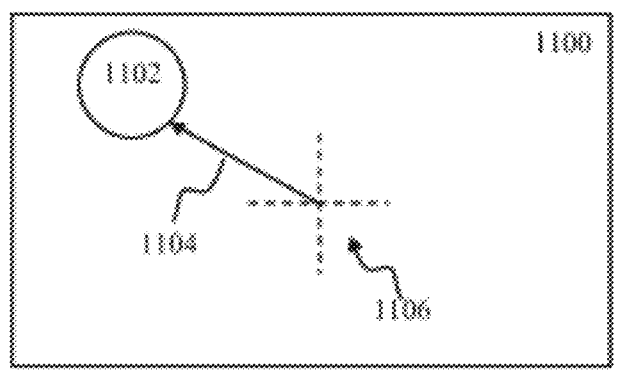
FIG. 11 is graphical illustration depicting target following by, e.g., camera of the EyeRover™ apparatus of FIG. 10, in accordance with one or more implementations.

Control signal generation methodology described above with respect to FIG. 4C may be employed in a variety of applications wherein some operations (behaviors) of a robotic device may be pre-programmed while other operations may be trained. By way of an illustration of a EyeRover™ robotic apparatus operation produced by Brain Corporation (see, e.g., description in BrainCorporationEyeRoverUserGuide.pdf). The EyeRover™ robotic apparatus, illustrated in FIG. 10, comprises motorized wheels 1002, 1004 and a motorized camera component 1010. The motorized camera component 1010 comprises actuators that may move a pair of cameras 1012, 1014 in two dimensions. The camera component may be configured to track an object and/or a person of interest (salient object). In some implementations, the salient object may comprise a person, a target (e.g., a ball, an enemy combatant), a vehicle, and/or other object/person. In some implementations, controller of the camera component 1010 may be operable in accordance with a pre-programmed algorithm configured to position the camera center of view (shown by cross hatch pattern 1106 in FIG. 11) at the object of interest (1102 in FIG. 11). The component 1010 controller may receive coordinates of the target 1102. The controller may operate the pre-programmed predictor component (e.g., 480 in FIG. 4C) to execute camera displacement operation illustrated by vector 1104 in FIG. 11). The EyeRover™ 1000 may comprise wheel controller component (e.g., the component 482) operable in accordance with a learning process. During tracking of a target (e.g., the ball 1102 in FIG. 11), the learning predictor may be trained to displace the EyeRover™ follow the target. The pre-programmed predictor may be configured to automatically adjust camera view vector to place the target at the center of view 1100 of the camera.

In some implementations, the camera component controller may be operable using a learning predictor process (e.g., 482) to follow an object of interest. The motorized wheels 1002, 1004 may be controlled by a pre-programmed predictor (480) to implement reflexive behavior to orient the EyeRover™ in a direction of the camera viewpoint (gaze).

In some implementations of a manipulator comprising two motorized joints, one joint may be controlled by a learning predictor (e.g., 482) while the other joint may be operated by a pre-programmed and/or pre-trained predictor (e.g., 480). By way of an illustration, the manipulator may support a camera and may be operable to maintain the camera pointing at a given location. One motorized joint of the manipulator may be operable using a learning predictor (e.g., 482) to adjust the manipulator in a first DOF. The other motorized joint may be operable by a pre-programmed and/or preconfigured predictor configured to automatically adjust camera orientation in order to maintain camera viewpoint.

In some implementations, the predicted control output 476, 486 of the components 480, 482 may comprise control signal designated for a given motor actuator. The predicted control output 476, 486 may comprise information related to quality of the motor control prediction. In one or more implementations, the prediction quality information may comprise variance of the predicted control signal determined over a given interval, confidence level (e.g., percentage), and or other measures. The component 472 may be configured to evaluate quality of predictions 476, 486. Based on determining that one prediction may be characterized by greater confidence (e.g., lower variance) the component 472 may select the respective signal as the output 488. In some implementations of controlling multiple DOF, the prediction quality evaluation may be configured on a component by component basis so that one or more DOF of the output 488 may be selected from prediction 476 while other DOF may be selected from prediction 486.

Figure 5A:
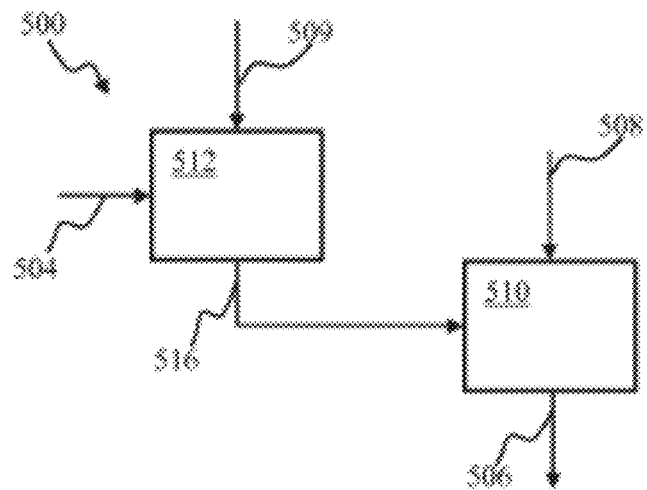
FIG. 5A is a block diagram illustrating a control apparatus comprising two cascaded predictors configured to determine a control output based on sensory input, according to one or more implementations.

FIG. 5A illustrates a control apparatus comprising two cascaded predictor components configured to determine a control output based on sensory input, according to one or more implementations.

The apparatus 500 in FIG. 5A may comprise predictor components 510, 512. The components 510, 512 may be configured to receive sensory information 508, 509, respectively. In one or more implementations, the sensory input 508, 509 may comprise all or a portion of sensory information available to the apparatus 500. In some implementations, the sensory information may comprise, e.g., the input 202 described above with respect to FIG. 2. By way of an illustration, the sensory input 508, 509 may comprise data from one or more sensors (audio, video, radio frequency, positioning, inertial, environmental, and/or other sensors) characterizing robotic apparatus and/or its environment, state (feedback) of the robotic platform (e.g., motor torque, current draw, battery voltage, position of actuators and/or controllable elements (e.g., rotor blade, rudder, wheel, and/or other controllable elements), and/or other parameters (e.g., depth/range map obtained from vision input using, e.g., LiDAR, structured light and/or other techniques).

In one or more implementations, individual ones of the sensory inputs 508, 509 may be configured different from one another, e.g., comprising a subset of the available sensory information. By way of an illustration, the input 508 may comprise visual data (e.g., video camera output). The input 509 may comprise one or more short-distance sensor output (e.g., IR, sonar, and/or other) used to determine the location of the obstacle relative to the robotic platform (e.g., 230 in FIG. 2). The control process of component 512 may be configured utilize the sensory input 509 (e.g., to determine location of obstacles) and/or the input 506 (e.g., to determine current action). The information 506, 509 may be combined by the control process of component 512 to produce the output 516. By way of an illustration, information 506 may indicate that the robot may be executing a turn (in accordance with the training input 504). Information 509 may indicate presence of an obstacle that may potentially interfere with the turn trajectory. Taking into account the current action information (e.g., the turn being executed) the process 512 may determine output 516 such that the turn trajectory is adjusted to avoid collision with the obstacle while accomplishing the target turn (e.g., 90° left). Execution obstacle avoidance in absence of the current action information may cause the robot to reverse its motion trajectory so as to recede from the obstacle. Such action may be contrary to the intent by the trainer as expressed by the training signal 504.

Predictor components 510, 512 may be configured to determine predicted output (506, 516, respectively). The predictor component 510 may be configured to operate an unattended control process, e.g., comprising a programmed, a pre-trained and/or otherwise pre-configured process that may be operable without input from a trainer, e.g., as described above with respect to FIG. 3 and/or FIGS. 4A-4B.

The predictor component 512 may be configured to operate a learning control process configured based on a teaching input 504 from an external (e.g., with respect to the component 512) agent. In some implementations, the component 512 may comprise the adaptive predictor 222 described above with respect to FIG. 2. The teaching input 504 may comprise an output of a combiner component (e.g., the output 204 in FIG. 2) configured based on a training input (e.g., 208 in FIG. 2). In one or more implementations of robotic vehicle navigation, the training input 504 may comprise target vehicle velocity and/or target vehicle steering angle. Such implementations may comprise an "override" functionality configured to cause a robot to execute action in accordance with the trainer-provided control signal instead of the predicted control signal. In some implementations, the training input 504 may comprise a correction (an increment/decrement) to vehicle velocity and/or direction, and/or other parameters. In one or more implementations, a training signal may convey one or more of a speed of the robot, a position of a multi-joined arm (e.g., Baxter arm), a position of a gripper (e.g., open/close), and/or other information.

In some implementations, the pre-programmed predictor component 510 may be used to produce output 506 for, e.g., navigating a given trajectory (e.g., 800 in FIG. 8). The learning predictor may be configured to produce corrections to the input 506 and provide corrected output 516. In some implementations, the output 516 may comprise control output configured for a robotic platform (e.g., the output 220 for the platform 230 in FIG. 2) and/or corrections provided to a combiner component (e.g., 208 for the component 214 in FIG. 2).

In some implementations, the hybrid controller architecture (e.g., the cascaded architecture of FIG. 5A) may be employed in order to reduce computational hardware complexity and/or costs associated with operating a learning process configured to implement all of the functionality for a given task (e.g., navigating a trajectory with sharp turns and/or unexpected obstacles by a robotic vehicle, balancing a manipulator arm and reaching for an object with a manipulator, and/or other applications). By separating a portion of the task control to a pre-configured predictor process (e.g., 512), the learning process computational complexity may be reduced. Such computational complexity reduction may be leveraged for a capability to execute more complex tasks using a given computational platform, and/or enabling use of simpler and/or lower cost computational hardware.

In some implementations, the output 506 may comprise prediction confidence information (e.g., variance, percent good, and/or other measure). The confidence information may be utilized by the predictor component 512 in order to determine instances when the programmed predictor output 510 may needs improvement.

In one or more implementation, the hybrid controller 500 of FIG. 5 may be utilized as a predictor component in a robotic system, e.g., the predictor 222 of the system 200 described above with respect to FIG. 2.

Figure 5B:
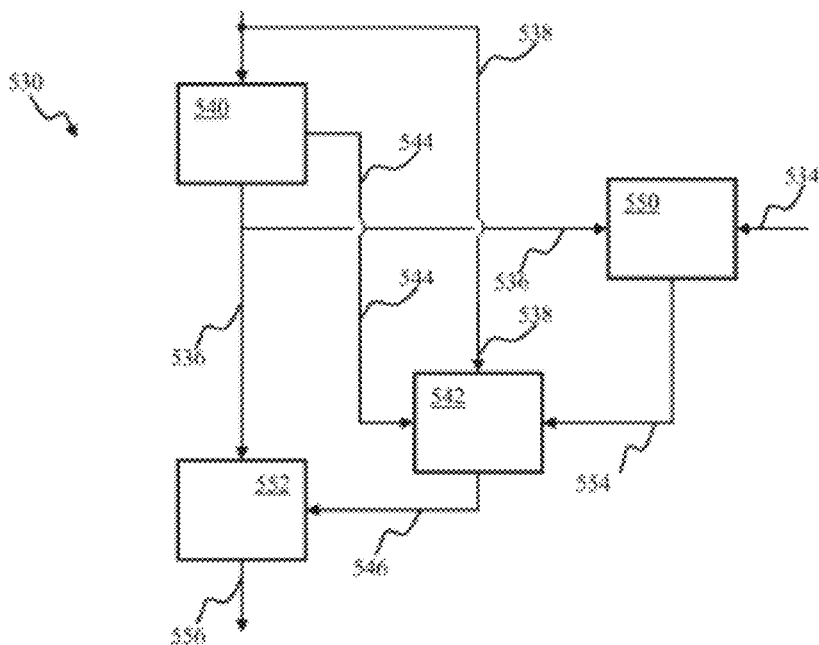
FIG. 5B is a block diagram illustrating a control apparatus comprising cascaded predictors configured to determine a control output based on sensory input, according to one or more implementations.

FIG. 5B illustrates a control apparatus comprising a cascaded predictor configuration for determining a control output based on sensory input, according to one or more implementations.

The apparatus 530 in FIG. 5B may comprise predictor component 540 configured to operate a pre-configured process and/or a pre-trained process. By way of an illustration, the component 540 may be pre-trained to enable a pre-configured behavior for a robotic device. The pre-configured (e.g., out of the box) behavior may be configured based on control output 536 configured based on analysis of sensory input 538. By way of an illustration, the pre-configured behavior may comprise navigation of the trajectory 800 of FIG. 8.

In some implementations, the sensory information 538 may comprise, e.g., the input 202 described above with respect to FIG. 2. By way of an illustration, the sensory input 538 may comprise one or more of information received from one or more sensors (e.g, audio, video, radio frequency, positioning, inertial, environmental, and/or other sensors) characterizing robotic apparatus and/or its environment, a state (feedback) of the robotic platform (e.g., motor torque, current draw, battery voltage, position of actuators and/or controllable elements (e.g., rotor blade, rudder, wheel), and/or other parameters), and/or other information.

The apparatus 530 in FIG. 5B may comprise predictor component 542 configured to operate learning prediction process, e.g., such as described above with respect to FIGS. 4A-5A, to produce output 546. The apparatus 530 may comprise a combiner component 552 configured to produce a control output 556 (e.g., motor activation output) configured based on a combination of the outputs 536, 546 of the components 540, 542, respectively. The component 540 may provide output 544 comprising information conveying quality of the prediction (e.g., prediction confidence, variance, percent good, and/or other measure).

The apparatus 530 may be operable to perform a task (e.g., behavior) based on the output 536. In absence of training input 534, the output 546 of the learning process of the component 542 may comprise a null signal. Examples of a null signal may include one or more of a zero value, a baseline signal (e.g., base voltage, base frequency, base pulse rate, and/or other base value), and/or other signal configured not to cause changes in the system output 556.

During operation of the apparatus 530, a user may elect to improve performance associated with execution of a task based on the output 536. By way of an illustration, a user may wish to train the apparatus 530 to navigate the trajectory 800 of FIG. 8 in presence of obstacles and/or to traverse turn portions (e.g., 806, 808) in shorter time.

In some implementations, methodology described with respect to FIG. 5B may be employed when a controller apparatus (e.g., 600 of FIG. 6) may comprise processing, energy, memory, and/or other resources that may prove insufficient for implementing a fully trainable implementations.

The task execution performance improvement may be configured based on a training input 534. In some implementations, the input 534 may comprise a motor control command provided by a user and/or a training entity (e.g., a trained computerized agent). Component 550 of the apparatus 530 may be configured to produce output 554 configured based on an evaluation of the output 536 of the pre-configured component 540 and the training input 534. In some implementations, the operation effectuated by the component 550 may comprise a difference, a comparison, and/or other operation configured to determine a discrepancy between the inputs 534, 536.

The discrepancy output 554 may be provided to the learning predictor component 542 as a teaching input. The learning process of the component 542 may be configured to produce output 546 based on analysis of the sensory input 538, the confidence output 544 of the predictor 540 and the teaching input 554. Learning process of the component 552 may be adjusted in order to develop an association between an instance of the sensory input 538 (e.g., an object representation) and the discrepancy output 554. Various machine learning approaches may be utilized with the component 552, e.g., an artificial neuron network, a look up table, and/or other approaches. random forests, Bayes classifier with conditionally independent feature model, such as described in e.g., U.S. patent application Ser. No. 13/756,372 entitled "SPIKING NEURON CLASSIFIER APPARATUS AND METHODS", filed Jan. 31, 2013, the foregoing being incorporated herein by reference in its entirety, regression, nearest neighbor algorithms, e.g., such as described in U.S. patent application Ser. No. 14/588,108 entitled "MULTIMODAL RANDOM KNN ENSEMBLES ROBOTIC CONTROLLER APPARATUS AND METHODS", filed Dec. 31, 2014, the foregoing being incorporated herein by reference in its entirety.

Output of the predictor component 536, 546 may be combined by component 552 to produce the control output 556. In one or more implementations, the combination process 556 may comprise one or more of an addition operation, a union operation, a weighted sum, an average, a concatenation, and/or other operation.

By way of an illustration, the apparatus 530 may be configured to operate a robotic vehicle (e.g., 100 in FIG. 1A) along a trajectory at a speed no greater than a posted limit (e.g., 40 km/h (25 miles/hour)). The pre-configured predictor component 540 may produce output 536 configured to drive the vehicle at a speed of 45 km/h, e.g., at a downhill portion of the trajectory. A trainer may utilize the training input 534 to provide a target speed of 40 km/h. The component 550 may produce a discrepancy output of −5 km/h. The learning predictor 542 may receive the sensory information (e.g., visual and/or motion data indicating a downhill portion of the trajectory) and the teaching input of −5 km/h. The predictor may initially (e.g., upon first presentation of a given sensory input-teaching input combination (context)) produce output 556 of −3 km/h. Output 45 km/h of the pre-programmed predictor may be combined with the learned correction of −3 km/h by the component 552 to produce the output 556 of 42 km/s. Upon encountering multiple presentations of the context, the predictor 542 may adjust its learning process to produce the target output (e.g., −5 km/h).

In some implementations, the output 556 may be provided to one or more component of a robotic platform (e.g., motors of a vehicle 100). The output 556 may be routed to a combiner component, e.g., 214 in FIG. 2. In some implementations, the output 556 may be combined with the teaching input 534 via the combiner. Such may enable use of the training signal 534 to control the robot directly when the training signal is available. In the above example, if the robot speed is in excess of the target speed (e.g., 42 km/h) the training signal of 40 km/h may be utilized to prevent navigation by the robot in excess of the maximum allowed speed of 40 km/h thereby improving safety and/or reducing probability of a collision. Accordingly, when the training signal is present, it may be used by a combiner to override the output 556 produced by the component 552 and to provide the training signal 534 as the motor output.

Robotic device operation comprising use of programming and/or training prediction methodology described herein may be utilized with a variety of robotic devices. In some implementations, a controller apparatus comprising pre-configured predictor and/or learning predictor (e.g., described with respect to FIGS. 2-5B) may be employed with a household appliance and/or industrial robotic vacuum cleaner apparatus e.g., such as shown and described with respect to FIGS. 1B-1C below.

FIG. 1B illustrates training and/or operation of a robotic vacuum cleaning apparatus comprising an adaptive controller configured in accordance with one or more implementations. A robotic vacuum cleaning apparatus may comprise an autonomous motorized platform, an onboard controller, a sensor component (e.g., video, infrared, ultrasonic, laser, LiDAR, structured light, time of travel sensor, and/or other sensor), a power source, a suction apparatus, and/or one or more brushing implements. Various mechanical configurations may be employed, e.g., with brushes installed on the lower (bottom) portion of the platform, and/or on sides of the platform. The robotic vacuum cleaning apparatus may be utilized to clean premises comprising a variety of objects (obstacles).

FIG. 1B illustrates use of an autonomous robotic vacuum cleaning apparatus for cleaning a room 150 comprising one or more furniture items 160, 162. Furniture arrangement in the room 150 may be characterized by one or more areas of limited accessibility (e.g., areas between the table 160 and the wall 174, areas behind the couch 162, and/or other areas). Micro-path following approach may be utilized in order to operate the robotic vacuum cleaning apparatus. By way of an illustration, one or more areas in the premises may be designated for auto-cleaning, wherein the robotic apparatus may operate based on a pre-programmed prediction process (e.g., described above with respect to components 410, 450, 480, 510, 540 of FIGS. 4A-5B). The robotic cleaning apparatus (shown by rectangle 140) may follow a trajectory e.g., 152 based on one or more pre-configured approaches, e.g., random exploration, corn-rowing, zig-zag, and/or other approaches. The robotic cleaning apparatus 140 may navigate the trajectory 152 using regular (e.g., obstacle-free) speed.

One or more areas within the room may be designated for trained cleaning, wherein the robotic apparatus may be trained to perform cleaning operations. By way of an illustration, a user may guide the robotic apparatus from location denoted by rectangle 142 to location denoted by rectangle 144 via trajectory 154; and/or from location denoted by rectangle 144 to location denoted by rectangle 146 via trajectory 156. The user guidance may provide training signal to the learning predictor (e.g., 404, 444, 474 described with respect to FIGS. 4A-4C and/or 504, 534 described with respect to FIGS. 5A-5B). The learning predictor in the robotic apparatus of FIG. 1B may be configured to modify its learning configuration (e.g., ANN weights, LUT entries) in order to develop an association between the context and the control output configured to navigate the robotic apparatus along trajectories 154, 156.

In one or more implementations, the robotic cleaning apparatus may be configured to explore user premises environment (e.g., the room 150 of FIG. 1B). The robotic apparatus may comprise one or more sensors (e.g., LiDAR, structured light, ultrasonic, IR proximity, and/or other sensors) configured to provide information about the environment (e.g., distance to walls, objects in the environment, and/or other environmental information). The robotic apparatus may comprise one or more sensors (e.g., inertial motion sensor, positioning sensor, odometry sensor, and/or other sensors) configured to provide information about motion of the apparatus. The robotic apparatus may be configured to explore (e.g., roam) the premises in order to map boundaries and/or object positions of the premises environment (e.g., the room 150). The environment exploration may comprise unattended operation (e.g., during day when the user is not at home). Upon performing premises exploration, the robotic apparatus may produce a map of the environment (e.g., map of the room 150). The user may subsequently train the robotic device to perform a task in accordance with a given trajectory. By way of an illustration, the user may guide the robot through a target trajectory (e.g., the trajectory 152, 156). The robot may be configured to record locations (e.g., waypoints) of the trajectory at given time intervals (e.g., between 1 and 40 times per second). During operation, control process of the robot may be configured to navigate a learned trajectory from one waypoint to another using a variety of approaches (e.g., shortest path, fastest path, lowest energy use, and/or other approaches). In one or more implementations, the learned trajectory navigation may comprise transition from one waypoint to another in a given order (e.g., the order the waypoints may be provided by the user). The control process may utilize the map of the environment obtained during exploration. The control process may be further configured to navigate the portion of the environment in absence of (or away from) waypoints provided by the user (e.g., using corn-row trajectory 152 away from obstacles). Switching between automated (e.g., 152) trajectory and user-trained (e.g., 154) trajectory navigation may be configured based on a variety of approaches, e.g., based on distance to nearest object/obstacle (e.g., 0.5 of the robot 140 dimension); user input (e.g., portion of the room may be designated for auto operation), mobile and/or fixed markers and/or beacons, and/or other approaches.

Subsequent to training, the robotic apparatus may perform cleaning operations in restricted access areas e.g., along trajectories 154, 156 in absence of user training input. In some implementations robotic cleaning apparatus may navigate trajectory 154 and/or 156 using slower (e.g., obstacle present) speed. It will be recognized by those skilled in the arts that the above examples serve to illustrate principles of the disclosure and various implementations of micro-path following approach may be utilized. In an industrial environment, one or more areas with cables, and/or sensitive equipment may be designated for training, e.g., via path following. In a household environment, areas around, e.g., dining table, appliances (e.g., home theater), surfboards, bicycles, may be may be designated for training, e.g., via path following.

Figure 1C:
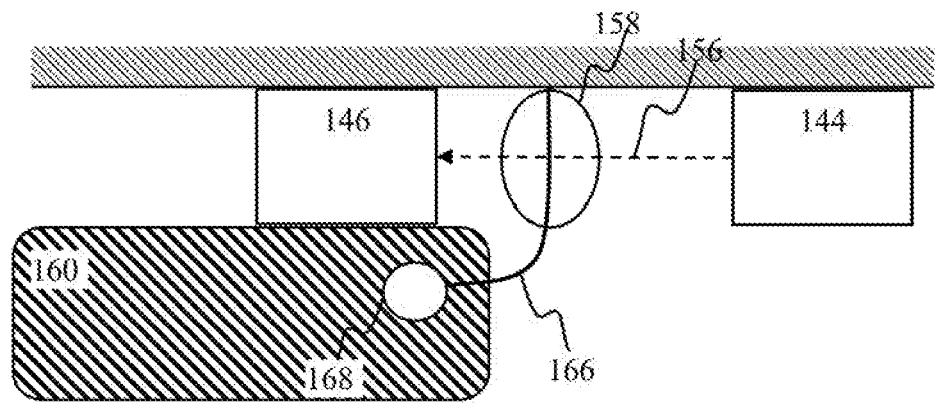
FIG. 1C is a graphical illustration depicting safe cable operation of the robotic vacuum cleaner apparatus, in accordance with one or more implementations.

In some implementations, robotic vacuum cleaning apparatus may be configured to implement safe cable operation, e.g., as shown and described with respect to FIG. 1C. A portion (e.g., 158 in FIG. 1C) of premises may be characterized by presence of cables and/or other sensitive areas (e.g., decorative tile, glass). A user may prefer that no brushing action may take place when the robotic cleaner traverses such areas. By way of an illustration, a cable 166 may extend to the appliance 168 disposed on the table 160. As the robotic cleaning apparatus traverses the trajectory 156 from location 144 to location 146 it may detect presence of the cable 166 in its path. While traversing over the cable 166 proximate area denoted by curve 158, the robotic cleaner controller may disable brush component rotation so as to reduce and/or eliminate cable wrapping (chewing) by the cleaning apparatus. In some implementations, the robotic cleaner may be configured to adjust clearance (e.g., distance between bottom of the enclosure and the floor surface and/or distance between the brushing component and the floor) with respect to the floor while traversing over cables. In some implementations, time instance associated with the disabling of the brushing component may be configured based on one or more of physical contact between a contact sensor (e.g., push contact, proximity detection whiskers) and the cable, a proximity sensor output (e.g., distance to the cable) and speed of approach of the cable by the robotic apparatus, and/or other parameters (e.g., prior outcomes)

In some implementations, a user may regard different portions of the premises (e.g., home and/or the room 150 in FIG. 1B) as having different priority level with respect to operations (e.g., cleaning) to be performed by the robotic apparatus (e.g., robotic vacuum cleaner). The user may communicate priority information to the robotic cleaning apparatus. In some implementations, the user may employ a pointer device in order to communicate information to the robotic apparatus e.g., such as described in U.S. patent application Ser. No. 13/601,721 entitled "APPARATUS AND METHODS FOR CONTROLLING ATTENTION OF A ROBOT", filed Aug. 21, 2012, the foregoing being incorporated herein by reference in its entirety. By way of an illustration, user may employ a laser pointer device to inform the robot that middle of the living room may be cleaned first, followed by the area in front of the entrance, followed by area behind the couch. In one or more implementations, the user may employ a computing user interface device (e.g., smartphone, a tablet, a laptop computer, a desktop computer) in order to indicate priority information. By way of an illustration, the user may utilize a touch sensitive input/output device (e.g. tablet) in order to draw areas and/or assign priority to one or more areas using map of the premises. In some implementations the premises map may be produced by the robotic apparatus based on premises exploration operations, e.g., described in detail herein. In one or more implementations, the robotic apparatus may comprise an interface (e.g., a button) configured to convey priority information. By way of an illustration, the user may communicate the priority using a sequence of button clicks (e.g., first click denoting priority one (highest priority), second click denoting priority two (second highest priority). In some implementations, the user may employ multiple clicks in a time interval (e.g., one, two, three, four clicks within one to two second time window) in order to communicate priority values of one, two, three, four, respectively. In one or more implementations, the robotic cleaning apparatus may comprise a dirt or debris sensor configured to detect presence of debris such as dust, dirt, hair, food, and/or other particles on the floor. The robotic cleaning apparatus may utilize debris occurrence statistics in order to automatically assign higher priority to dirtiest areas based on the debris statistics. Various debris occurrence statistics may be utilized, e.g., occurrence per unit of time, occurrence per unit of area, total number of detected debris events, and/or other parameters. In some implementations, priority may be assigned based on history of training by the user, e.g., areas corresponding to more frequent training may be assigned greater priority compared to less frequently trained areas.

In some implementations, the robotic cleaning apparatus may be configured to perform cleaning operations in a time window. Lower priority operations (e.g., cleaning behind the couch) not completed within the time window may be not performed. Performance of task execution by the robotic cleaning apparatus may be evaluated. Performance evaluation may comprise determining time spent cleaning individual portions, battery usage, cleanliness of the cleaned premises (e.g., as adjudged by remaining refuse and/or dirt), and/or other criteria. Outcome of performance evaluation may be used to modify parameters of the robotic apparatus controller, e.g., travel speed, suction flow rate, brush rotation speed, and/or other parameters.

In some implementations, the user may utilize a remote user interface device to navigate the robotic cleaner during training. Various used interface devices may be used e.g., RF, IR remote controllers, an application executed on a portable device, e.g., tablet, smartphone, and/or other device. In some implementations, the user may employ a push-stick (e.g., attached mechanically to the enclosure of the robotic cleaner) in order to guide the robotic cleaner along training trajectory. The user may provide an indication related to training mode to the controller of the robotic cleaner. The training indication may be provided via a variety of approaches, e.g., a command via an app, a button on the remote control and/or enclosure of the cleaner, an electrical contact on the body of the cleaner that may be activated as a result of push-stick being attached, and/or other approaches.

It will be recognized by those skilled in the arts that the description herein of vacuum cleaning operations serves to illustrate principles of the disclosure and various other operations may be utilized with the methodology described herein. Examples of such operations may include one or more of washing, polishing, waxing, spot detection and removal, sanding, paint application, trash collection, security patrol, and/or other operations that may be performed by an autonomous robotic platform.

Figure 6:
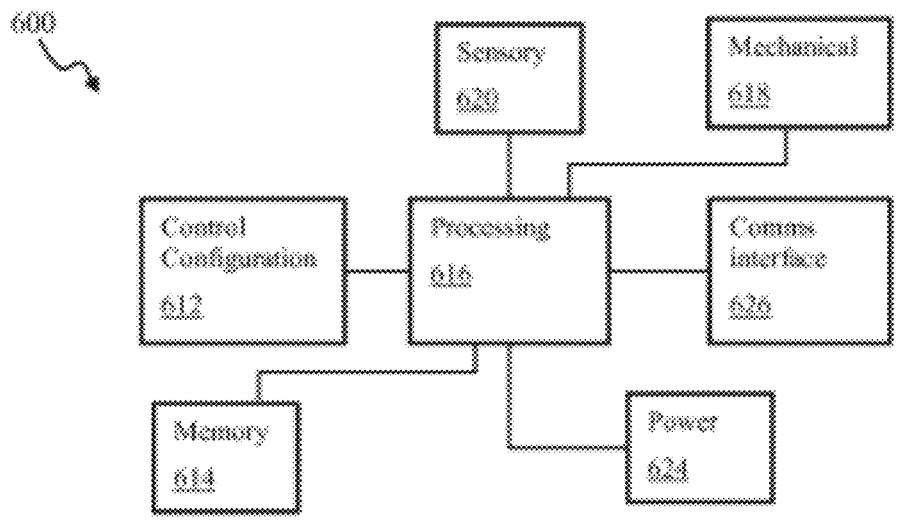
FIG. 6 is a functional block diagram illustrating components of a robotic controller apparatus for use with the programming and training robotic control methodology, in accordance with one or more implementations.

FIG. 6 illustrates components of a robotic controller apparatus for use with the programming and training robotic control methodology, in accordance with one or more implementations. The robotic controller apparatus 600 may comprise a control configuration component 612 for implementing a control process. In some implementations, the control configuration may comprise a learning process (also referred to as the robotic brain) (e.g., for implementing predictor 412, 482, 512 in FIGS. 4A-4C, 5A, respectively), and/or pre-configured process (e.g., for implementing predictor 410, 480, 512 of FIGS. 4A, 4C, 5A). The learning configuration component may be logically implemented within a processor that executes a computer program embodied as instructions stored in non-transitory computer readable media, and configured for execution by the processor. In some implementations, the robotic brain may be implemented as dedicated hardware, programmable logic (e.g., field programmable gate arrays (FPGAs), and/or other logical components), application specific integrated circuits (ASICs), and/or other machine implementations. Memory 614 and processing components 616 may be available for other hardware/firmware/software needs of the robotic device. The memory component 614 may be configured to store computer executable instructions configured to effectuate a pre-configured predictor component operation (e.g., 410, 480, 510 and/or other) The processing component 616 may interface to the sensory component 620 in order to perform sensory processing e.g., object detection, face tracking, stereo vision, and/or other tasks.

The processing component 616 may interface with the mechanical components 618, sensory components 620, electrical components 622, power components 624, communications ("comms") component 626, and/or other components via one or more driver interfaces and/or software abstraction layers. In one or more implementations, the power components 624 may comprise one or more of a direct current, an alternating current source, a mechanical coupling, an energy accumulator, a mechanical energy means (e.g., a flywheel, a wind-up apparatus, and/or other mechanical energy means), a wireless charger, a radioisotope thermoelectric generator, a piezo-generator, a dynamo generator, a fuel cell, an internal combustion engine, an external combustion engine, a pneumatic power source, a hydraulic power source, and/or other power sources.

Additional processing and memory capacity (not shown) may be used to support these processes. However, it will be appreciated that the one or more of the mechanical components 618, sensory components 620, and/or electrical components 622 may be fully controlled based on the operation of the learning configuration 612. Supplemental memory and processing capacity may also aid in management of the controller apparatus (e.g. loading executable code (e.g., a computational brain image), replacing the executable code, executing operations during startup, and/or other operations). As used herein, a "computational brain image" may comprise executable code (e.g., binary image files), object code, bytecode, an array of weights for an artificial neuron network (ANN), and/or other computer formats.

Consistent with the present disclosure, the various components of the device may be remotely disposed from one another, and/or aggregated within one of more discrete components. For example, learning configuration software may be executed on a server apparatus, and control the mechanical components of a robot via a network or a radio connection. In another such example, multiple mechanical, sensory, and/or electrical units may be controlled by a single robotic brain via network/radio connectivity.

The mechanical components 618 may include virtually any type of component capable of motion (e.g., to move the robotic apparatus 600, manipulate objects external to the robotic apparatus 600 and/or perform other actions) and/or configured to perform a desired function or task. These may include, without limitation: motors, servos, pumps, hydraulics, pneumatics, stepper motors, rotational plates, micro-electro-mechanical devices (MEMS), electro-active polymers, and/or other motive components. The components interface with the learning configuration and enable physical interaction and manipulation of the device.

The sensory components 620 may enable the robotic device to accept stimulus from external entities. Input stimulus types may include, without limitation: video, audio, haptic, capacitive, radio, accelerometer, ultrasonic, infrared, thermal, radar, LiDAR, sonar, and/or other sensed inputs.

The electrical components 622 may include virtually any electrical component for interaction and manipulation of the external environment. Examples of electrical components 622 may include one or more of light/radiation generating components (e.g. light emitting diodes (LEDs), infrared (IR) sources, incandescent light sources, and/or other light/radiation generating components), audio components, monitors/displays, switches, heating elements, cooling elements, ultrasound transducers, lasers, and/or other electrical components. Such components enable a wide array of potential applications in industry, personal hobbyist, building management, medicine, military/intelligence, and other fields.

The communications component 626 may include one or more connections configured to interact with external computerized devices to allow for, inter alia, management and/or control of the robotic device. The connections may include any of the wireless or wireline interfaces discussed above, and further may include customized or proprietary connections for specific applications.

The power system 624 may be configured to support various use scenarios of the device. For example, for a mobile robot, a wireless power solution (e.g., battery, solar cell, inductive (contactless) power source, rectification, and/or other mobile power source) may be appropriate. However, for fixed location applications which consume significant power (e.g., to move heavy loads, and/or other power intensive tasks), a wall power supply (or similar high capacity solution) may be a better fit. In addition, in some implementations, the power system and or power consumption may be configured with the training of the robotic apparatus 600. Thus, the robot may improve its efficiency (e.g., to consider power consumption efficiency) through learned management techniques specifically tailored to the tasks performed by the robotic apparatus.

Figure 7:
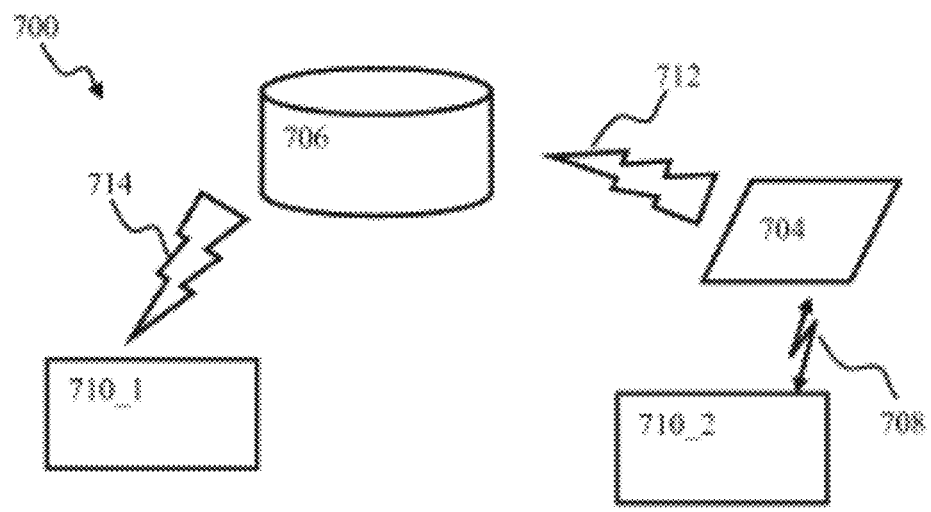
FIG. 7 is a functional block diagram depicting a system comprising robotic controller apparatus, according to one or more implementations.

FIG. 7 illustrates a computerized system comprising a controller apparatus of the disclosure, in accordance with one implementation. The system 700 may comprise a computerized entity 706 configured to communicate with one or more controllers 710 (e.g., 710_1, 710_2). In some implementations, the entity 706 may comprise a computing cloud entity (e.g., a cloud service, a server, in a public, private or hybrid network). In one or more implementations, the entity may comprise a computer server, a desktop, and/or another computing platform that may be accessible to a user of the controller 710. In some implementations of the cloud computing services, one or more controller apparatus 710 may communicate with the entity 706 in order to access computing resources (e.g., processing cycles and/or memory) in order to, e.g., detect features and/or objects in sensory data provided by, e.g., sensor module 106 of FIG. 1A. In some implementations, the controller apparatus 710 may communicate with the entity 706 in order to save, load, and/or update, their processing configuration (e.g., the configuration 612 in FIG. 6). The robotic brain images may comprise executable code (e.g., binary image files), bytecode, an array of weights for an artificial neuron network (ANN), and/or other computer formats. In some implementations, the controller apparatus 710 may communicate with the entity 706 in order to save, and/or retrieve learned associations between sensory context and actions of a robot, e.g., as described in U.S. patent application Ser. No. 14/244,888, entitled "LEARNING APPARATUS AND METHODS FOR REMOTE CONTROL OF ROBOTIC DEVICES VIA SPOOFING", filed Apr. 3, 2014 and incorporated herein by reference in its entirety.

In FIG. 7, one or more controller apparatus (e.g., 710_1) may connect to the entity 706 via a remote link 714, e.g., WiFi, and/or cellular data network. In some implementations, one or more controller apparatus (e.g., 7102) may connect to the entity 706 via a local computerized interface device 704 using a local link 708. In one or more implementations, the local link 708 may comprise one or more of a network (Ethernet), wireless link (e.g. Wi-Fi, Bluetooth, infrared, radio), serial bus link (USB, Firewire) and/or other links. The local computerized interface device 704 may communicate with the cloud server entity 706 via link 712. In one or more implementations, links 712 and/or 714 may comprise an internet connection, and/or other network connection effectuated via any of the applicable wired and/or wireless technologies (e.g., Ethernet, Wi-Fi, LTE, CDMA, GSM, and/other protocols).

In one or more applications that may require computational power in excess of that that may be provided by a processing module of the controller 710_2 the local computerized interface device 704 may be used to perform computations associated with training and/or operation of the robotic body coupled to the controller 710_2. The local computerized interface device 704 may comprise a variety of computing devices including, for example, a desktop PC, a laptop, a notebook, a tablet, a phablet, a smartphone (e.g., an iPhone®), a printed circuit board and/or a system on a chip (SOC) comprising one or more of general processor unit (GPU), field programmable gate array (FPGA), multicore central processing unit (CPU), an application specific integrated circuit (ASIC), and/or other computational hardware.

Figure 9:
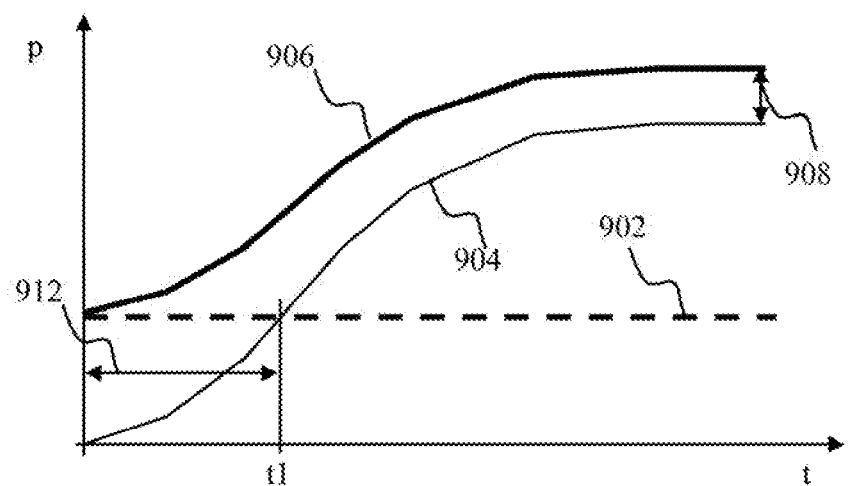
FIG. 9 is a plot depicting performance of a controller apparatus of, e.g., FIG. 4A-4C, according to one or more implementations.

FIG. 9 illustrates performance of a controller apparatus of, e.g., FIG. 4A-4B, according to one or more implementations.

Curves 904, 906 depict performance measure p as a function of time t. The performance measure p in FIG. 9 may correspond to probability of success (determined, e.g., as a ratio of number of times a task was completed over number of times the task was attempted). In some implementations (not shown) the performance measure may comprise one or other parameters, e.g., used energy, elapsed time along trajectory, deviation from target trajectory (e.g., RMS error, maximum absolute deviation), and/or other measures. Curve 902 in FIG. 9 may correspond to performance obtained by a controller (e.g., 400, 440, 470, 500 described above with respect to FIGS. 4A-5) configured based on operation of the preconfigured/unattended predictor (e.g., 410, 450, 480, 510). In some implementations, e.g., such as illustrated in FIG. 9, performance of the unattended/preconfigured control process may be characterized by a steady level of performance (e.g., as depicted by horizontal line 902). In one or more implementations of an adaptive pre-configured control process (e.g., Kalman filter not shown), performance of the unattended/preconfigured control process may converge to the level 902 at time scales $t \ll t1$ (e.g., $t \sim 0.1\ t1$).

Curve 904 in FIG. 9 may correspond to performance obtained by a hybrid control process (e.g., 400, 440, 470, 500 described above with respect to FIGS. 4A-5) configured based on operation of the learning predictor (e.g., 412, 452, 482, 512). Initially (e.g., at time interval 912 $t<t1$) performance obtained using the learning predictor may be below performance of the pre-configured predictor. At time greater than t1 performance of the learning predictor may exceed performance of the pre-configured predictor.

Curve 906 illustrates performance of a controller apparatus comprising the learning predictor and the pre-configured predictor. As may be seen from FIG. 9, the performance of the combined controller remains above performance of the individual controllers. Upon completion of training, the combined controller (e.g., pre-configured and learning) approach may provide for an improved performance (by amount 908) over controller operable solely using the learning combiner.

FIGS. 12A-13B illustrate exemplary methods of operating an adaptive apparatus comprising a pre-configured and a learning prediction components, according to one or more implementations. The operations of methods 1200, 1220, 1240, 1300, 1320 presented below are intended to be illustrative. In some implementations, methods 1200, 1220, 1240, 1300, 1320 may be accomplished with one or more additional operations not described, and/or without one or more of the operations discussed. Additionally, the order in which the operations of methods 1200, 1220, 1240, 1300, 1320 are illustrated in FIGS. 12A-13B described below is not intended to be limiting.

Methods 1200, 1220, 1240, 1300, 1320 may be implemented in one or more processing devices (e.g., a digital processor, an analog processor, a digital circuit designed to process information, an analog circuit designed to process information, a state machine, and/or other mechanism for electronically processing information and/or configured to execute computer program modules stored as computer readable instructions). The one or more processing devices may include one or more devices executing some or all of the operations of methods 1200, 1220, 1240, 1300, 1320 in response to instructions stored electronically on a non-transitory electronic storage medium. The one or more processing devices may include one or more devices configured through hardware, firmware, and/or software to be specifically designed for execution of one or more of the operations of methods 1200, 1220, 1240, 1300, 1320. The operations of methods 1200, 1220, 1240, 1300, 1320 may be implemented by a learning controller apparatus (e.g., 400, 440, 470, 500, 530 in FIGS. 4A-5B) configured to control a robotic device (e.g., 100, 140 in FIGS. 1A-1B).

Figure 12A:
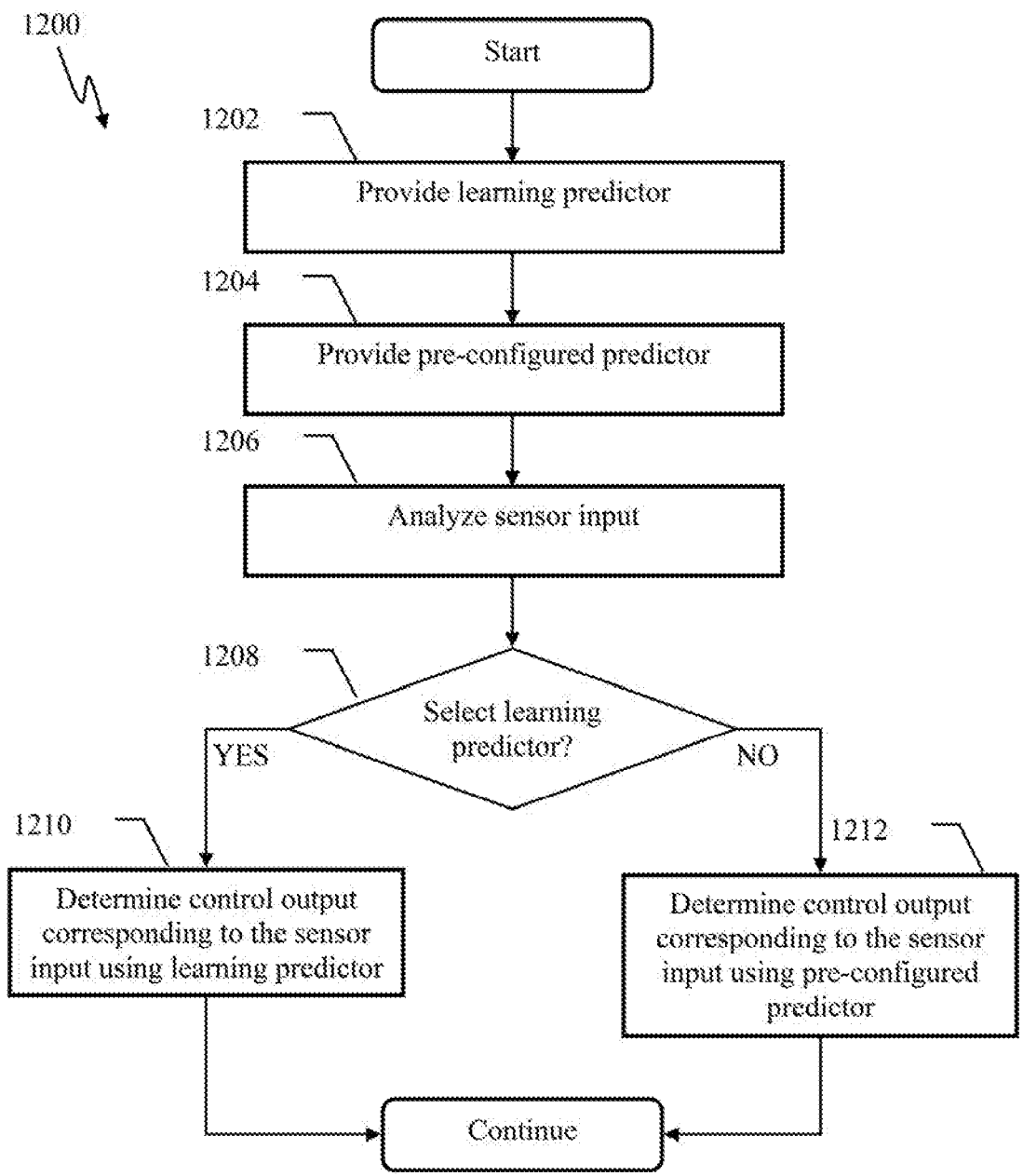
FIGS. 12A-12C illustrate exemplary methods of operating an adaptive apparatus comprising a pre-configured and a learning prediction components, according to one or more implementations.

FIG. 12A illustrates operation of a controller comprising a pre-configured predictor and a learning predictor, in accordance with one or more implementations. Operations of method 1200 may be employed by a robotic device configured to execute a task (e.g., navigate trajectory 800 in FIG. 8, perform refuse collection operation, and/or other task).

At operation 1202 of method 1200, a learning predictor may be provided. In one or more implementations, the learning predictor provision may comprise providing a computer readable code configured to implement a learning predictor component of the disclosure (e.g., described above with respect to components 412, 452, 482, 512, 542 of FIGS. 4A-5B, respectively). In one or more implementations, the learning process provision may comprise configuring learning rate, learning process type (e.g., supervised, unsupervised, reinforcement), and/or other operations.

At operation 1204 a pre-configured predictor may be provided. In one or more implementations, the pre-configured predictor provision may comprise providing a computer readable code configured to implement a pre-configured prediction process of the disclosure (e.g., described above with respect to components 410, 450, 480, 510, 540 of FIGS. 4A-5B, respectively). In one or more implementations, the pre-configured process provision may comprise loading learned configuration (e.g., array of ANN efficacies, array of LUT, and/or other configuration) obtained prior during based on training of a behavior, and/or other operations.

At operation 1206 sensor input may be analyzed. In some implementations, sensor input may comprise one or more of audio, video, range, acoustic, IR, structured light, LiDAR, radio frequency, positioning, inertial, environmental, and/or other sensors characterizing robotic apparatus and/or its environment, state (feedback) of the robotic platform (e.g., motor torque, motor position, motor load, battery current draw, battery voltage, position of actuators and/or controllable elements (e.g., rotor blade, rudder, wheel), and/or other parameters). In some implementations of a learning controller for home animation, the sensory information may comprise ambient environment data (e.g., temperature, humidity, pressure, daylight), inputs from appliances such as valves, doors, locks, light switches, light fixture status, entertainment components, and/or other data. In some implementations, the sensory data may comprise pre-processed data e.g., edges, color patches obtained from camera data, platform speed, tilt obtained from inertial measurements, and/or other processed data.

In one or more implementations of visual data processing, the sensor data may comprise a plurality of features that may be detected in the sensory output may comprise representations of objects, corner, edges, patches of texture, color, brightness, and/or other patterns that may be present in visual output; audio patterns (e.g., speech elements), and/or other persistent signal patterns that may be relevant to a given task. It is noteworthy, that a given pattern and/or data item (e.g., representation of an orange fruit on a tree and/or time of day) may comprise a relevant feature for one task (e.g., harvesting of oranges) and may be ignored by other tasks (e.g., navigation around trees). Various feature detection methodologies may be applied to processing of the sensor output. In some implementations, the feature detection may be configured to implement a filter operation (e.g., orange mask to detect orange objects); a Radon transform edge detection; corner detection (e.g., using Harris operator), texture detection (e.g., using Laws masks); patterns of motion (e.g., using optical flow); and/or other methodologies.

At operation 1208 a determination may be made as to whether the learning predictor may be selected. The determination may be based on analysis of sensory input, task parameters, state of the robot, and/or other parameters. The determination operation 1208 may be configured based on a fixed (e.g., pre-configured non-learning) process and/or a learning process e.g., as described above with respect to FIGS. 4A-4B. In some implementations, the selection process may comprise a pre-programmed, a previously trained process, and/or pre-configured adaptive process (e.g., Kalman filter), a learning process (e.g., using one or more of supervised, reinforcement learning approaches).

Based on determination that the learning predictor may be selected the method may proceed to operation 1210 wherein control output corresponding to the sensor input using learning predictor may be determined.

By way of illustration of one such implementation of a robotic manipulator operable to collect objects, the determination operation 1208 may utilize visual, position, and/or other sensors in order to determine location of the grasping component relative an object. Upon detecting that an object may be present proximate the gripper, the selection process may select learning predictor in order to enable the gripper learning controller to produce control signal for object grasping. The learning controller operation may be configured based on training input, e.g., the input 404, 444, 474 described above with respect to FIGS. 4A-4C.

Based on determination at operation 1208 that the pre-configured predictor may be selected the method may proceed to operation 1212 wherein control output corresponding to the sensor input using pre-configured predictor may be determined. By way of illustration of one such implementation of a robotic manipulator operable to collect objects, upon detecting that no objects are being proximate the gripper, the selection process may select the pre-configured predictor (reflexive behavior) in order to produce control signal configured to implement exploration of the environment by the robot in order to locate objects.

Figure 12B:
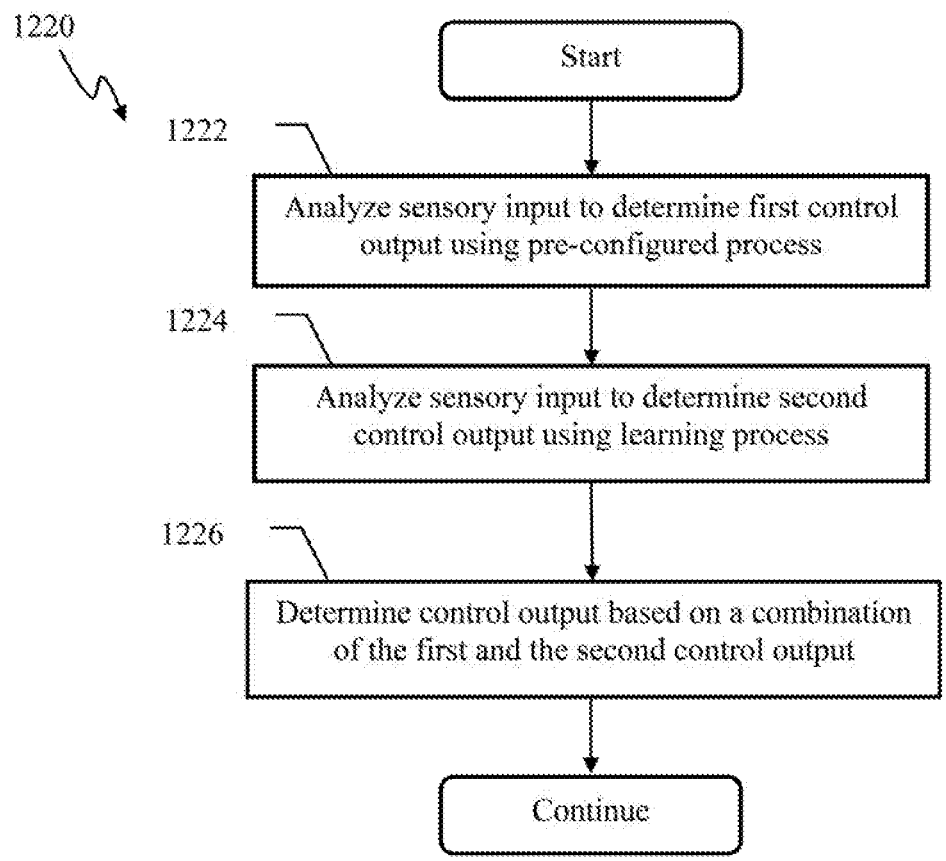

FIG. 12B illustrates a generalized method of operating a controller apparatus comprising a pre-configured predictor and a learning predictor, in accordance with one or more implementations. Operations of method 1220 may be employed by the controller of a robotic apparatus characterized by, e.g., multiple DOF, e.g., such as described above with respect to FIG. 4C.

At operation 1222 of method 1220 sensory input may be analyzed and first output may be determined using a pre-configured prediction process. In one or more, the sensory input analysis may comprise operations described above (e.g., with respect to FIGS. 1A-5B and/or 12A). The first output may comprise one or more of motor commands, prediction confidence, action indication, and/or other output configured to enable task execution by the robotic apparatus. In some implementations of operating a robotic device characterized by a plurality operational degrees of freedom (DOF), the first output may comprise control signal configured to operate a portion of the DOF (e.g., an actuator controlling forward/backward motion of a vehicle).

At operation 1224 sensory input may be analyzed and to determine second control output using a learning process. The second output may comprise one or more of motor commands, prediction confidence, action indication, and/or other output configured to enable task execution by the robotic apparatus. In some implementations of operating a robotic device characterized by a plurality operational DOF, the second output may comprise control signal configured to operate another portion of the DOF (e.g., an actuator controlling left/right motion of the vehicle) compared to the output produced at operation 1222. In one or more implementations, the first and the second output obtained at operations 1222, 1224 may be configured to operate the same set of actuators.

At operation 1226 control output may be determined based on a combination of the first and the second control output. In some implementations, operation 1226 may be configured to select one of the first or the second output as the control output based on analysis of prediction confidence of the first and the second outputs. In one or more implementations, operation 1226 may be configured to combine the first output and the second output using averaging, a weighted average, and or other operation.

In one or more implementations wherein the control output may be configured to operate multiple DOF of a robotic device, operation 1226 may be configured to concatenate the first output with the second output to produce the control output.

Figure 12C:
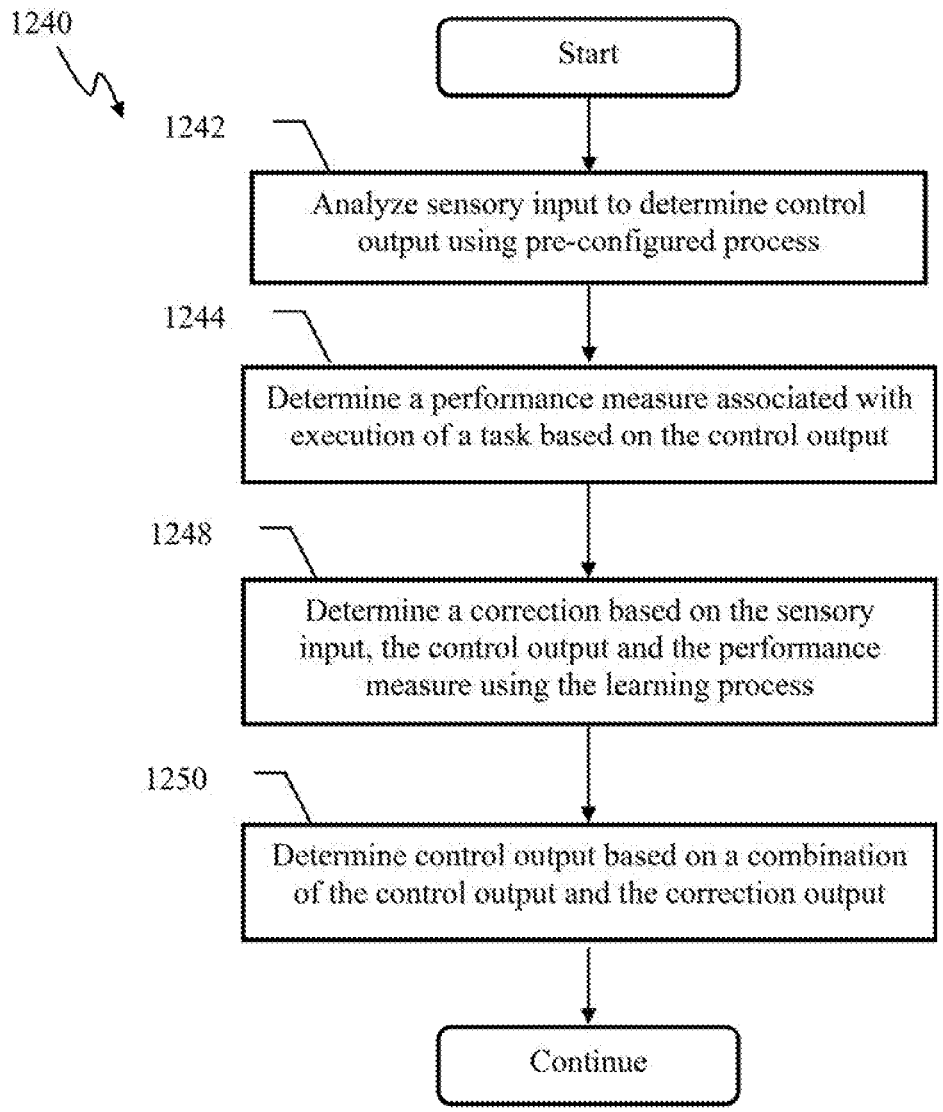

FIG. 12C illustrates operation of a controller comprising a pre-configured predictor and a learning predictor, in accordance with one or more implementations. Operations of method 1240 of FIG. 12C may be employed for, e.g., improving of existing behaviors and/or provision of additional (trained) behaviors, updating of existing behaviors when performing hardware upgrades and/or maintenance, and/or other tasks.

At operation 1242 of method 1240, sensory input may be analyzed to determine control output using the pre-configured process. In some implementations, the sensory input analysis may comprise operations described above (e.g., with respect to FIGS. 1A-5B and/or 12A).

At operation 1244 a Determine a performance measure associated with execution of a task based on the control output may be determined. The performance measure determination may be based on evaluation of an actual trajectory associated with task execution based on the control output and a target trajectory for the task. Multiple task executions may be performed using multiple instances of operations 1242, 1244. In one or more implementations, the performance measure determination may comprise determination of a variety of parameters, e.g., number of failures, success rate, mean time between failures, average deviation from target, cumulative deviation from target, elapsed time, maximum elapsed time, maximum absolute deviation, used energy, proximity indicator status, presence (and number of collisions), and/or other parameters.

At operation 1248 a correction may be determined based on sensory input, the control output and the performance measure using the learning process. In some implementations, the correction determination by the learning process may be configured based on a training input (e.g., 404, 444, 474, 504 in FIGS. 4A-5A).

At operation 1250 an updated control output may be determined based on a combination of the control output and the correction. In some implementations, the combination may comprise an addition, a concatenation, a union, and/or other operation. In one or more implementations of an override combiner, the training input (e.g., of operation 1248) may comprise an override indication wherein the correction may be selected as the combined output.

Figure 13A:
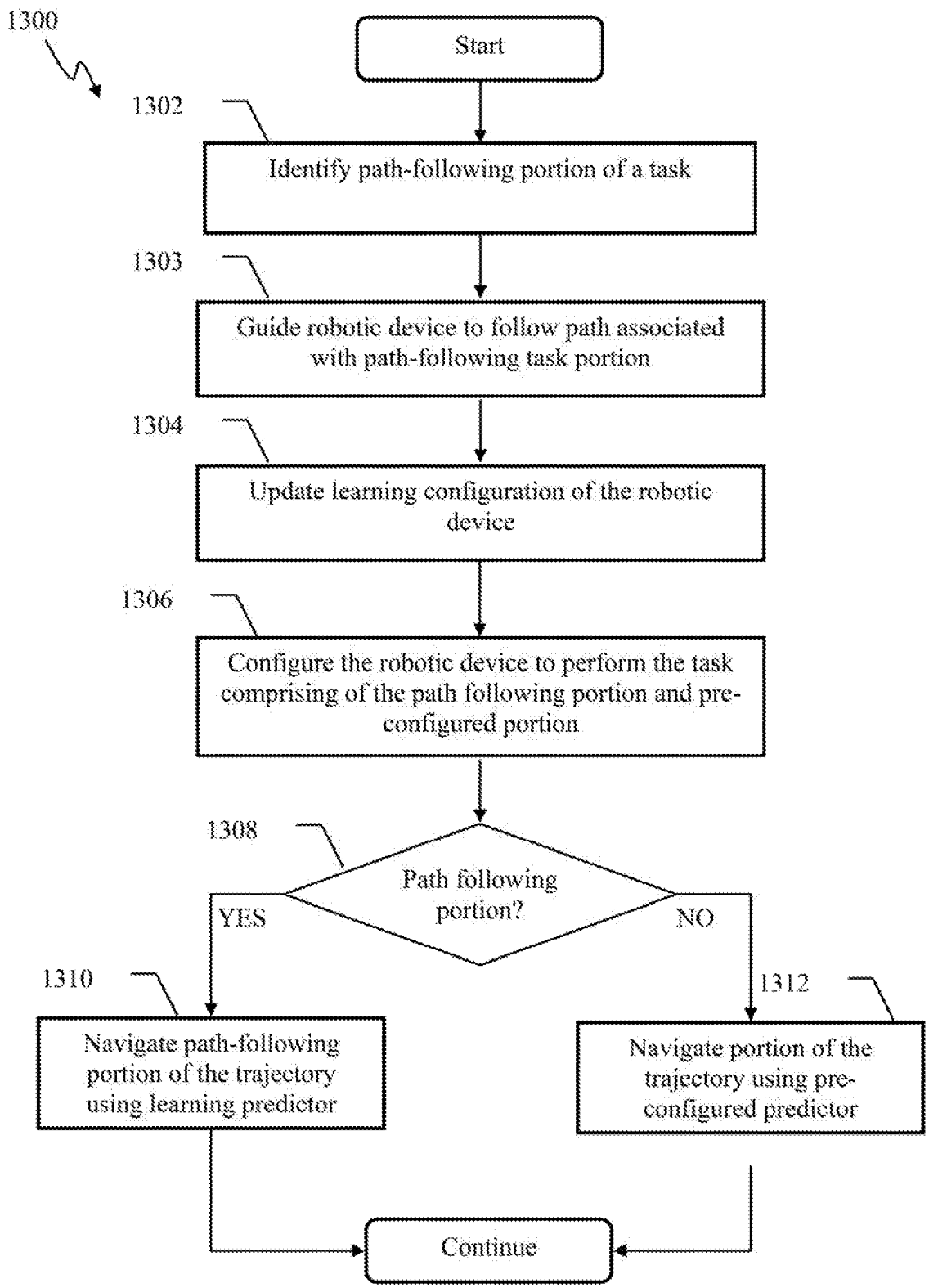
FIG. 13A illustrates an exemplary method of operating a robotic device using pre-configured and learning prediction components, according to one or more implementations.

FIG. 13A illustrates an exemplary method of operating a robotic device using pre-configured and learning prediction components, according to one or more implementations. Operations of method 1300 of FIG. 13A may be employed for, e.g., improving of existing behaviors and/or provision of additional (trained) behaviors, customizing operation of robotic appliances to premises, and/or other tasks.

At operation 1302 of method 1300, one or more path following portions of a task may be identified. In some implementations, the task may comprise premises cleaning task to be performed by robotic cleaning apparatus; path following portions may be identified by a user of the apparatus using a remote controller, a pointing device (e.g., a laser pointer); a wireless interface (e.g., app on a smartphone). In some implementations, the path-following portions may be identified by controller of the robotic device based on analysis of sensory input. By way of an illustration, portions of the premises proximate boundaries and/or objects may be regarded by the controller as path-following portions. In some implementations, the sensory input analysis may comprise operations described above (e.g., with respect to FIGS. 1A-5B and/or 12A).

At operation 1303 user may guide the robotic device to follow a path associated with a given path-following portion of the task. In some implementations, the robotic device may comprise robotic cleaner; the user may utilize a remote user interface device to navigate the robotic cleaner during training. Various used interface devices may be used e.g., RF, IR remote controllers, an application executed on a portable device, e.g., tablet, smartphone, and/or other device. In some implementations, the user may employ a push-stick (e.g., attached mechanically to the enclosure of the robotic cleaner) in order to guide the robotic cleaner along training trajectory. The user may provide an indication related to training mode to the controller of the robotic cleaner. The training indication may be provided via a variety of approaches, e.g., a command via an app, a button on the remote control and/or enclosure of the cleaner, an electrical contact on the body of the cleaner that may be activated as a result of push-stick being attached, and/or other approaches.

It will be recognized by those skilled in the arts that above description of vacuum cleaning operations serves to illustrate principles of the disclosure and various other cleaning operations may be utilized with the methodology described herein. These operations include, but are not limited to, washing, polishing, waxing, spot detection and removal, sanding, paint application, trash collection, security patrol, and/or other operations that may be performed by an autonomous robotic platform. The robotic device may comprise a control system comprising pre-configured and a learning predictor, e.g., as described above with respect to FIGS. 2A-5B.

At operation 1304 learning configuration of the control system of the robotic device may be updated based on the path guidance operation 1303. Guiding of the robotic device along a path may be configured to provide teaching input (e.g., 404, 444, 474, 504 in FIGS. 4A-5A) to the learning process (e.g., predictor 412, 452 of FIGS. 4A-4B) of the robotic device controller. The learning predictor in the robotic apparatus of FIG. 1B may be configured to modify its learning configuration (e.g., ANN weights, LUT entries) in order to develop an association between the context and the control output configured to navigate the robotic apparatus along the path-following portion of the task trajectories (e.g., 154, 156 in FIG. 1B). Subsequent to training, the robotic device may be capable of path-following (e.g., operating in constrained areas of premises e.g., along trajectories 154, 156) in absence of user training input. It will be recognized by those skilled in the arts that the above examples serve to illustrate principles of the disclosure and various implementations of micro-path following approach may be utilized. In an industrial environment, one or more areas with cables, and/or sensitive equipment may be designated for training, e.g., via path following. In a household environment, areas around, e.g., dining table, appliances (e.g., home theater), surfboards, bicycles, may be may be designated for training, e.g., via path following.

At operation 1306 the robotic device may be configured to perform the task comprising of the path following portion and pre-configured portion. In some implementations, the task corresponding to operation 1306 may comprise cleaning of premises by an autonomous robotic cleaning apparatus (e.g., robotic vacuum cleaner). The configuration operation 1308 may comprise configuring pre-programmed predictor (e.g., 410, 450), learning predictor (e.g., 412, 452, 482) and/or switching component 402, 442, 472 described above with respect to FIGS. 4A-4C, respectively.

At operation 1308 a determination may be made by controller of the robotic apparatus as to whether a given portion of the trajectory (e.g., area within the room 150 in FIG. 1B) may correspond to path-following portion. Determination operation 1308 may comprise evaluation of sensory input (e.g., location of the robotic device in the premises and/or with respect to objects within the premises, previous actions corresponding to a given location, and/or other data). Responsive to determination at operation 1308 that a given portion of the trajectory may correspond to the path following portion, (e.g., 154 in FIG. 1B) the method 1300 may proceed to operation 1310 wherein the path-following portion of the trajectory may be navigated using output of the learning process. In some implementations, the learning process output may be configured bases on analysis of sensory input, and/or developed associations between sensory input and control output. By way of an illustration, based on a determination that the robotic cleaner may be at location 142 in FIG. 1B, the learning process may provide control output associated with navigation of the trajectory 154.

Responsive to determination at operation 1308 that a given portion of the trajectory may not correspond to the path following portion (e.g., may correspond to area associated with the trajectory 152 in FIG. 1B) the method 1300 may proceed to operation 1312 wherein a portion of the trajectory may be navigated using pre-configured control process output. In some implementations, the pre-configured control process output may be configured to implement a corn-row pattern, a zig-zag pattern, random exploration, and/or other trajectories. By way of an illustration, based on a determination that the robotic cleaner may be at location 140 in FIG. 1B, the pre-configured process may provide control output associated with navigation of the corn-row trajectory 152.

Figure 13B:
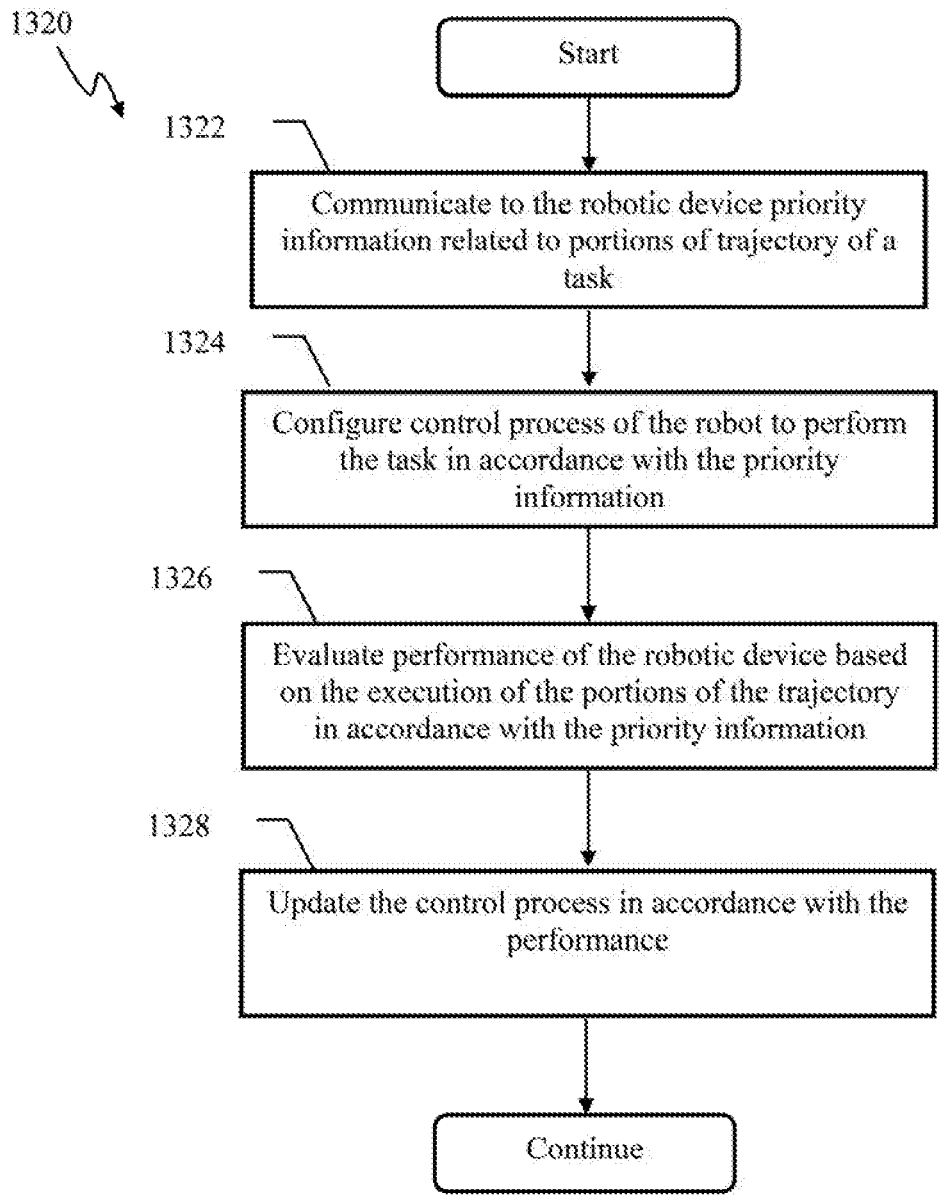
FIG. 13B illustrates an exemplary method of operating a robotic device using task prioritizing, according to one or more implementations.

FIG. 13B illustrates an exemplary method of operating a robotic device using trajectory prioritizing, according to one or more implementations. Operations of method 1320 of FIG. 13B may be employed for, e.g., operating a household robotic appliance (e.g., robotic cleaner) when cleaning user premises, and/or for maintaining an industrial (e.g., non-residential) premises.

At operation 1322 of method 1320, priority information related to portions of trajectory of a task may be communicated to the robotic device. In some implementations, the priority information may be communicated by a user of the robotic device using, e.g., a dedicated remote controller (e.g., RF, IR remote); a portable communications device operating an app; and/or a pointer device e.g., such as described in U.S. patent application Ser. No. 13/601,721 entitled "APPARATUS AND METHODS FOR CONTROLLING ATTENTION OF A ROBOT", filed Aug. 21, 2012, the foregoing being incorporated herein by reference in its entirety. By way of an illustration, user may employ a laser pointer device to inform the robot that middle of the living room may be cleaned first, followed by the area in front of the entrance, followed by area behind the couch.

At operation 1324 control process of the robot may be configured to perform the task in accordance with the priority information. In one or more implementations, the configuration operation 1324 may comprise storing propriety information, storing sensory information related to a trajectory portion associated with a given priority setting; and/or other operations. In some implementations, time duration for executing trajectory portions and/or the overall trajectory may be provided. The robotic device may comprise a robotic vacuum cleaner; the task may comprise cleaning of a room and/or a household; trajectory portions may comprise portions of a room and/or portions of the household (e.g., hallway, kitchen, room).

It will be recognized by those skilled in the arts that above description of vacuum cleaning operations serves to illustrate principles of the disclosure and various other cleaning operations may be utilized with the methodology described herein. These operations include, but are not limited to, washing, polishing, waxing, spot detection and removal, sanding, paint application, trash collection, security patrol, and/or other operations that may be performed by an autonomous robotic platform. In some implementations, the methodology described herein may be applied for maintaining commercial (e.g., stores, hotels, public halls), and/or industrial (e.g., non-residential) premises and comprise devices configured for scrubbing, polishing, buffing, sweeping, and/or other maintenance operations. In one implementations, a robotic device of the disclosure may be utilized in an industrial electronics manufacturing and/or assembly application for applying an antistatic wax to floor tiles. The robotic device may comprise a control system comprising pre-configured and a learning predictor, e.g., as described above with respect to FIGS. 2A-5B.

At operation 1326 performance of the robotic device based on the execution of the portions of the trajectory in accordance with the priority information. Performance evaluation may comprise determining time spent cleaning individual portions, battery usage, cleanliness of the cleaned premises (e.g., as adjudged by remaining refuse and/or dirt), and/or other criteria At operation 1328 the control process may be updated in accordance with the performance information obtained at operation 1326. In one or more implementations, the update operation 1328 may comprise modification of parameters of learning component (e.g., 412, 452, 482, 512, 542 of FIGS. 4A-5B, respectively). In some implementations, outcome of performance evaluation may be used to modify parameters of the robotic apparatus controller, e.g., travel speed, suction flow rate, brush rotation speed, and/or other parameters.

Implementations of the principles of the disclosure may be applicable to a wide assortment of applications including computer-human interaction (e.g., recognition of gestures, voice, posture, face, and/or other interactions), controlling processes (e.g., processes associated with an industrial robot, autonomous and other vehicles, and/or other processes), augmented reality applications, access control (e.g., opening a door based on a gesture, opening an access way based on detection of an authorized person), detecting events (e.g., for visual surveillance or people or animal counting, tracking).

A video processing system of the disclosure may be implemented in a variety of ways such as, for example, a software library, an IP core configured for implementation in a programmable logic device (e.g., FPGA), an ASIC, a remote server, comprising a computer readable apparatus storing computer executable instructions configured to perform feature detection. Myriad other applications exist that will be recognized by those of ordinary skill given the present disclosure.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A robotic system, comprising:
   one or more sensors configured to receive a sensory context;
   a non-transitory computer readable medium comprising computer readable instructions stored thereon; and
   at least one processor configured to execute the computer readable instructions to,
   output a first signal by a learning predictor based on a teaching signal and the sensory context;
   cause the learning predictor to produce a first confidence information associated with the first signal;
   output a second signal by a pre-configured predictor based on the sensory context;
   cause the pre-configured predictor to produce a second confidence information associated with the second signal;
   produce a third output signal based on the sensory context and the first and second signals, the third output signal being configured to cause the robotic system to perform a task, wherein the third signal is a weighted combination of the first and second signals and the weighted combination is based on the first and second confidence information;
   wherein the task comprises the robotic system navigating along a route; and
   the teaching signal corresponds to a user providing input to cause the robotic system to learn the route.

2. The robotic system of claim 1, wherein the second signal produced by the pre-configured predictor is based on a prior training of a behavior of the robotic system.

3. The robotic system of claim 1, wherein,
   the sensory context corresponds to detection of an object in an environment of the robotic system; and the teaching signal corresponds to the task of the robotic system in response to detection of the object.

4. The robotic system of claim 1, wherein the at least one processor is further configured to execute the computer readable instructions to,
select the second signal if the sensory context comprises detection of the object; and select the first signal if the sensory context does not comprise the detection of the object.

5. The robotic system of claim 4, wherein,
the second signal comprises an activation signal for a brush component of a vacuum of the robot, the brush being deactivated upon the detection of the object and reactivated upon the robotic system navigating beyond the object.

6. A non-transitory computer readable storage medium comprising computer readable instructions stored thereon that, when executed by at least one processor, configure the at least one processor to,
output a first signal by a learning predictor based on a teaching signal and a sensory context received by one or more sensors;
cause the learning predictor to produce a first confidence information associated with the first signal;
output a second signal by a pre-configured predictor based on the sensory context;
cause the pre-configured predictor to produce a second confidence information associated with the second signal;
produce a third output signal based on the sensory context and the first and second signals, the third output signal being configured to cause a robotic system to perform a task, wherein the third signal is a weighted combination of the first and second signals and the weighted combination is based on the first and second confidence information; wherein the task comprises the robotic system navigating along a route; and
the teaching signal corresponds to a user providing input to cause the robotic system to learn the route.

7. The non-transitory computer readable storage medium of claim 6, wherein the second signal produced by the pre-configured predictor is based on a prior training of a behavior of the robotic system.

8. The non-transitory computer readable storage medium of claim 6, wherein,
the sensory context corresponds to detection of an object in an environment of the robotic system; and
the teaching signal corresponds to the task of the robotic system in response to detection of the object.

9. The non-transitory computer readable storage medium of claim 6, wherein the at least one processor is further configured to execute the computer readable instructions to,
select the second signal if the sensory context includes detection of the object; and select the first signal if the sensory context does not include the detection of the object.

10. The non-transitory computer readable storage medium of claim 9, wherein,
the second signal comprises an activation signal for a brush component of a vacuum of the robot, the brush being deactivated upon the detection of the object and reactivated upon the robotic system navigating beyond the object.

11. A method for navigating a robotic system, comprising:
outputting a first signal by a learning predictor based on a teaching signal and the sensory context;
producing a first confidence information associated with the first signal by the learning predictor;
outputting a second signal by a pre-configured predictor based on the sensory context;
producing a second confidence information associated with the second signal by the pre-configured predictor;
producing a third output signal based on the sensory context and the first and second signals, wherein the third signal is a weighted combination of the first and second signals, the weighted combination being based on the first and second confidence information;
the third output signal being configured to cause the robotic system to perform a task, wherein the task comprises the robotic system navigating along a route; and
the teaching signal corresponds to a user providing input to cause the robotic system to learn the route.

12. The method claim 11, wherein the pre-configured predictor produces the second signal based on prior training of a behavior of the robotic system.

13. The method of claim 11, further comprising:
selecting the second signal if the sensory context includes detection of the object; and selecting the first signal if the sensory context does not include the detection of the object, wherein,
the second signal comprises an activation signal for a brush component of a vacuum of the robot, the brush being deactivated upon the detection of the object and reactivated upon the robotic system navigating beyond the object.

14. A robotic system, comprising:
one or more sensors configured to receive a sensory context;
a non-transitory computer readable storage medium comprising computer readable instructions stored thereon; and
at least one processor configured to execute the computer readable instructions to,
output a first signal by a learning predictor based on a teaching signal and the sensory context;
cause the learning predictor to produce a first confidence information associated with the first signal;
output a second signal by a pre-configured predictor based on the sensory context; cause the pre-configured predictor to produce a second confidence information associated with the second signal; and
produce a third output signal based on the sensory context and the first and second signals, the third output signal being configured to cause the robotic system to perform a task, wherein the third signal is a weighted combination of the first and second signals, the weighted combination being based on the first and second confidence information.

15. The robotic system of claim 14, wherein,
the pre-configured predictor is configured to produce the second signal based on prior training of a behavior of the robotic system,
the task comprises the robotic system navigating along a route,
the teaching signal corresponds to a user providing input to cause the robotic system to learn the route, and
the third signal corresponds to navigation of the route along a target trajectory in accordance with the task.

* * * * *